(12) United States Patent
Raizen et al.

(10) Patent No.: US 9,063,661 B1
(45) Date of Patent: Jun. 23, 2015

(54) AUTOMATED UPDATING OF PARAMETERS AND METADATA IN A FEDERATED STORAGE ENVIRONMENT

(71) Applicant: EMC Corporation, Hopkinton, MA (US)

(72) Inventors: Helen S. Raizen, Jamaica Plain, MA (US); Ajith Balakrishnan, Karanataka (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/227,051

(22) Filed: Mar. 27, 2014

(51) Int. Cl.
*G06F 3/06* (2006.01)

(52) U.S. Cl.
CPC ............ *G06F 3/0611* (2013.01); *G06F 3/0653* (2013.01); *G06F 3/0674* (2013.01)

(58) Field of Classification Search
None
See application file for complete search history.

(56) References Cited

U.S. PATENT DOCUMENTS

| | | |
|---|---|---|
| 6,434,637 B1 | 8/2002 | D'Errico |
| 8,370,592 B1 | 2/2013 | Specht et al. |
| 8,468,180 B1 | 6/2013 | Meiri et al. |

*Primary Examiner* — Farley Abad
(74) *Attorney, Agent, or Firm* — Muirhead and Saturnelli, LLC

(57) ABSTRACT

Described are techniques for parameter selection. First processing is performed that migrates data of a first device from an origin to a destination data storage system. The first processing includes cutover processing. After cutover processing is performed, requests to the first device are serviced by the destination data storage system rather than the origin data storage system. During first processing, occurrence of cutover processing is detected. Responsive to detecting the occurrence of cutover processing, second processing is performed to update one or more parameters each having a value that varies in accordance with a type of physical data storage system. Prior to second processing, the parameters have values determined in accordance with a type of physical data storage system of the origin data storage system, and after second processing, the parameters have values determined in accordance with a type of physical data storage system of the destination data storage system.

20 Claims, 17 Drawing Sheets

Response to inquiry command 1352

| bit →<br>↓byte | 7 | 6 | 5 | 4 | 3 | 2 | 1 | 0 |
|---|---|---|---|---|---|---|---|---|
| 0 | Peripheral qualifier | | | | Peripheral device type | | | |
| 1 | RMB | Device-type modifier | | | | | | |
| 2 | ISO version | | ECMA version | | | ANSI-approved version | | |
| 3 | AEC | TrmIOP | Reserved | | Response data format | | | |
| 4 | Additional length (N-4) | | | | | | | |
| 5 | Reserved | | | | | | | |
| 6 | Reserved | | | | | | | |
| 7 | RelAdr | WBus32 | WBus16 | Sync | Linked | Reserved | CmdQue | SftRe |
| 8–15 | Vendor identification (ASCII) | | | | | | | |
| 16–31 | Product identification (ASCII) | | | | | | | |
| 32–35 | Product revision level | | | | | | | |
| 36–55 | Vendor-specific | | | | | | | |
| 56–95 | Reserved | | | | | | | |
| 96..N | Vendor-specific parameters (variable number of bytes) | | | | | | | |

FIG. 12

AUTOMATED UPDATING OF PARAMETERS AND METADATA IN A FEDERATED STORAGE ENVIRONMENT

BACKGROUND

1. Technical Field

This application generally relates to data storage systems, and more particularly to techniques for automated updating of parameters used in connection with data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O operations in connection with data requests, such as data read and write operations.

Host systems may store and retrieve data using a data storage system containing a plurality of host interface units, disk drives, and disk interface units. Such data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical units, logical devices or logical volumes. The logical units may or may not correspond to the actual physical disk drives. Allowing multiple host systems to access the single storage device unit allows the host systems to share data stored therein.

An application may execute on a host where the application performs I/O (input/output) operations. The host may be able to transmit the data operation to the data storage system over any one or more different paths or multiple paths. Multipathing functionality, such as for path selection and management of the multiple paths, may be handled by a device driver of the host. When an application on the host issues an I/O operation, it may be received by a device driver of the host which facilitates sending and/or receiving transmissions between the application and the data storage system.

SUMMARY OF THE INVENTION

In accordance with one aspect of the invention is a method for performing parameter selection comprising: performing first processing that migrates data of a first device from an origin data storage system to a destination data storage system, the first processing including cutover processing whereby, after the cutover processing is performed, requests to the first device are serviced by the destination data storage system and not the origin data storage system; detecting, during the first processing, occurrence of the cutover processing; and responsive to detecting the occurrence of the cutover processing, performing second processing to update one or more parameters each having a value that varies in accordance with a type of physical data storage system, wherein prior to the second processing, the one or more parameters have values determined in accordance with a type of physical data storage system associated with the origin data storage system, and wherein after the second processing, the one or more parameters have values determined in accordance with a type of physical data storage system associated with the destination data storage system. The origin and destination data storage systems may be included in a federated storage environment. The one or more parameters may include a first parameter identifying a load balancing policy used by a multipath driver of a client in connection with selecting a path from a plurality of paths when the client sends I/Os directed to the first device. The first device may be visible to the client over each of the plurality of paths. The one or more parameters may include a parameter denoting whether to enable or disable a feature of a client sending I/Os to the first device. The one or more parameters may include a timing parameter having a time threshold value selected in accordance with a type of physical data storage system to which I/O requests are sent. Detecting occurrence of said cutover processing may include detecting a state change of a path between a host and the destination data storage system over which said first device is visible to a client. The state change may result in the path, over which the first device is visible to the client, transitioning from a first state to an active state, wherein the active state may indicate that I/O operations directed to the first device which are sent on the path are serviced. The first device may be a logical device having a first identity, and the first processing may include migrating the first identity from the origin data storage system to the destination data storage system. The first identity may be a federation level identity of the logical device that is migrated from the origin data storage system to the destination data storage system by the first processing. The federation level identity may include a logical device identifier and a first set of one or more items of data identifying the logical device as a member of a federated storage environment having its storage provisioned on one or more data storage systems of the federated storage environment. The logical device identifier may be a unique world wide name. The first set of one or more items of data may identify the logical device as a member of the federated storage environment and such items may be returned to a client in response to a first non-I/O command issued to the first device over a path to the first device. The logical device identifier may be returned to the client in response to a second non-I/O command issued to the first device over a path to the first device. The first device may have a second identity that is a data storage dependent identity that varies with data storage system upon which storage is provisioned for the first device and the second identity also varies with one or more paths over which the first device is visible. Prior to completing the cutover processing for the first device, the first device may have the second identity in accordance with the origin data storage system and one or more paths between a host and the origin data storage system over which the first device is visible, and after completing the cutover processing for the first device, the first device has the second identity in accordance with the destination data storage system and one or more paths between a host and the destination data storage system over which the first device is visible. The second identity may include a second set of one or more items of information identifying a type of physical data storage system upon which the first device is currently located. The second set of one or more items of information may be used by the second processing to determine values for the one or more parameters each having a value that varies in accordance with a type of physical data storage system servicing I/O requests. The second set of one or more items may be returned to the client in response to sending a third non-I/O command to the first device over a path to the first device. The detection and the second processing may be performed by the client that sends I/O requests to the first device. The client may include a multi-path driver including a federated storage environment module and a plurality of data storage-specific modules, wherein each of the plurality of data storage-specific modules may select values for the one or more parameters for a particular type of physical data storage system. The second processing may include the federated storage environment module invoking code of a first of the plurality of data storage-specific modules. The first data storage-specific module may be selected based on a type of physical data storage system associated with the destination data storage system. At a point during the first processing, the first device may be included in the origin data storage system and may be visible to a client on a first path between the client and the origin data storage system. Additionally, a second device may be included in the destination data storage system and may be visible on a second path between the client and the destination data storage system. The second deice may be another logical device having the first identity that is the federation level identity of the first device and the second device may have a second data storage dependent identity dependent upon a type of physical data storage system of the destination data storage system. The client may identify the first path and the second path as two different paths to a same device having the first identity that is the federation level identity.

In accordance with another aspect of the invention is a computer readable medium comprising code stored thereon that performs parameter selection, the computer readable medium comprising code that, when executed by a processor, performs a method comprising: performing first processing that migrates data of a first device from an origin data storage system to a destination data storage system, the first processing including cutover processing whereby, after the cutover processing is performed, requests to the first device are serviced by the destination data storage system and not the origin data storage system; detecting, during the first processing, occurrence of the cutover processing; and responsive to detecting the occurrence of the cutover processing, performing second processing to update one or more parameters each having a value that varies in accordance with a type of physical data storage system, wherein prior to the second processing, the one or more parameters have values determined in accordance with a type of physical data storage system associated with the origin data storage system, and wherein after the second processing, the one or more parameters have values determined in accordance with a type of physical data storage system associated with the destination data storage system.

In accordance with another aspect of the invention is a system comprising a host and a federated storage environment. The federated storage environment includes a first data storage system and a second data storage system, wherein the first data storage system is an origin data storage system including a first device and the second data storage system is a destination data storage system with respect to first processing that migrates data of the first device from the origin data storage system to the destination data storage system. The host comprises a memory with code stored therein that, when executed by a processor, performs a method comprising: detecting, during the first processing, occurrence of cutover processing, wherein the first processing migrates data of the first device from the origin data storage system to the destination data storage system, the first processing including the cutover processing whereby, after the cutover processing is performed, requests to the first device are serviced by the destination data storage system and not the origin data storage system; and responsive to detecting the occurrence of the cutover processing, performing second processing to update one or more parameters each having a value that varies in accordance with a type of physical data storage system, wherein prior to the second processing, the one or more parameters have values determined in accordance with a type of physical data storage system associated with the origin data storage system, and wherein after the second processing, the one or more parameters have values determined in accordance with a type of physical data storage system associated with the destination data storage system.

BRIEF DESCRIPTION OF THE DRAWINGS

Features and advantages of the present invention will become more apparent from the following detailed description of exemplary embodiments thereof taken in conjunction with the accompanying drawings in which:

FIG. 12 is an example of a response payload returned in response to a command in an embodiment in accordance with techniques herein;

DETAILED DESCRIPTION OF EMBODIMENT(S)

Figure 1:
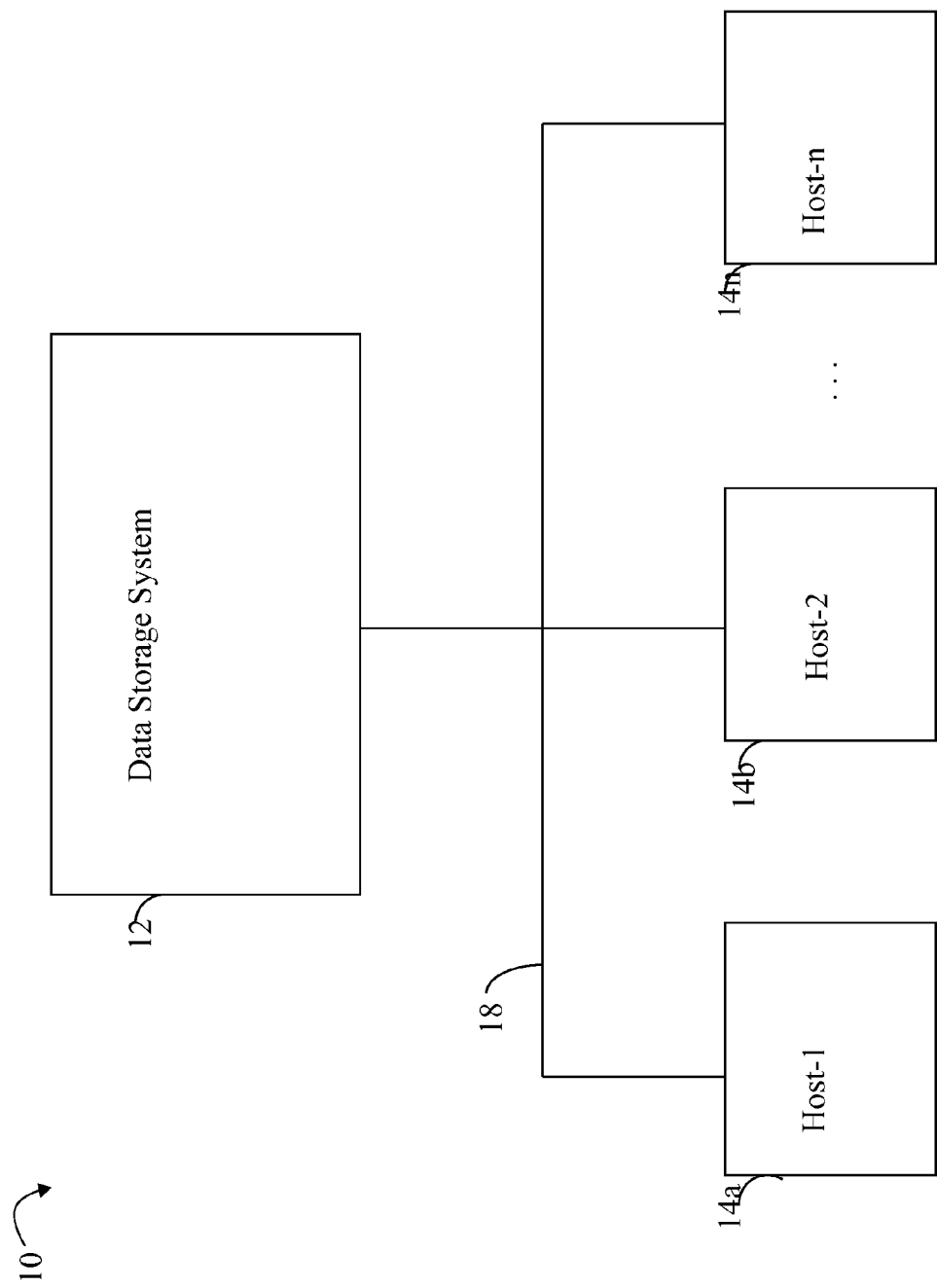
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Figure 2A:
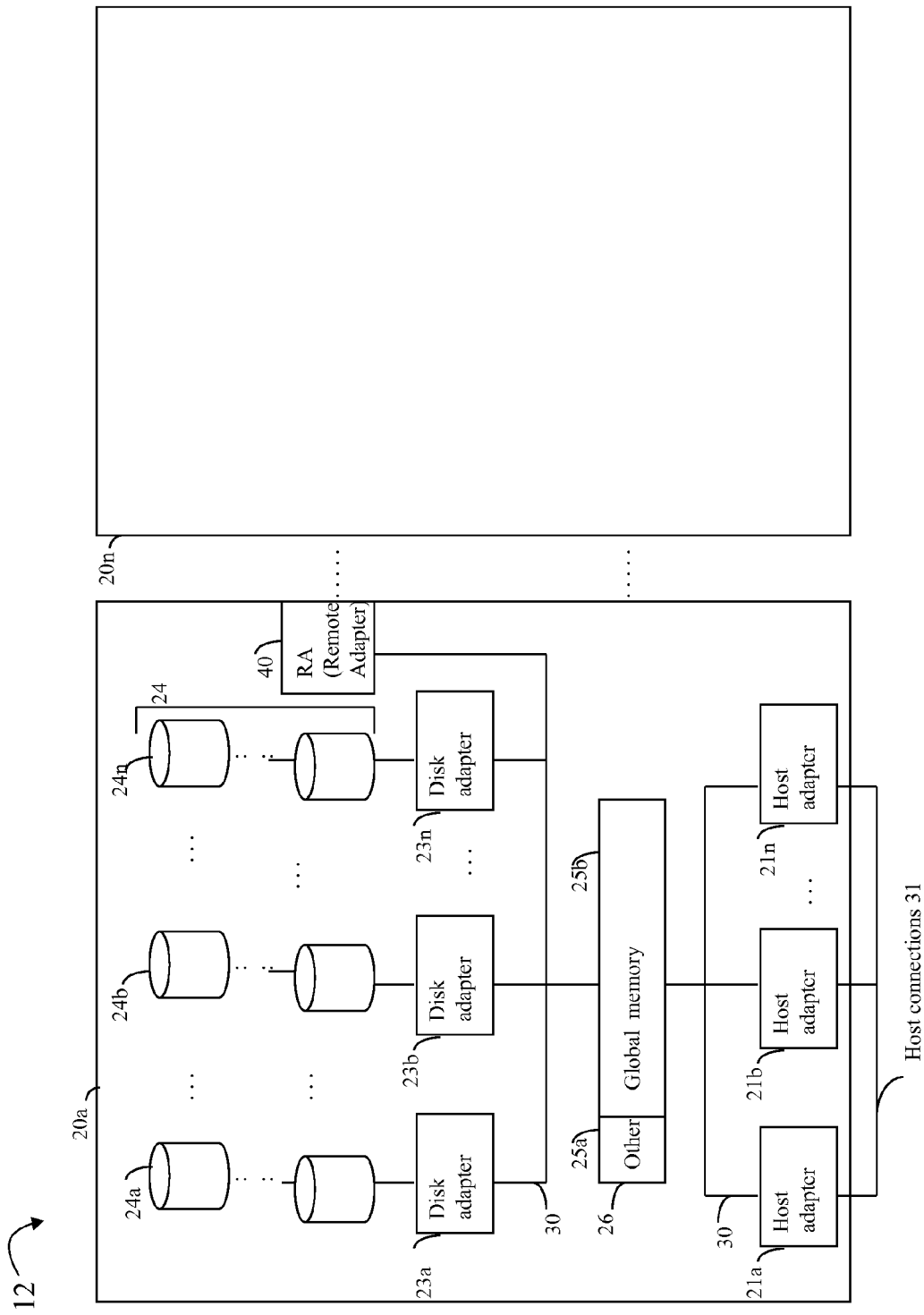
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA performs I/O operations on a disk drive. Data residing on a disk drive may be accessed by the DA following a data request in connection with I/O operations that other directors originate.

Figure 2B:
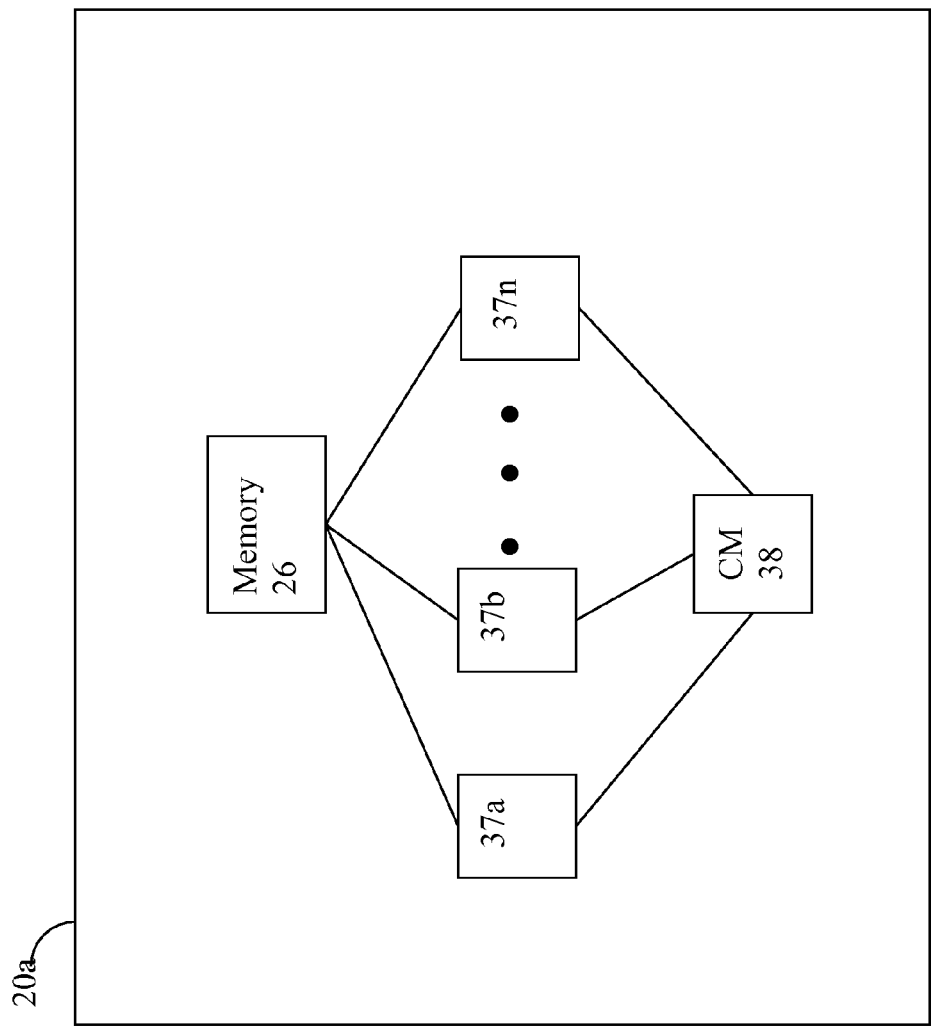
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system.

Figure 3:
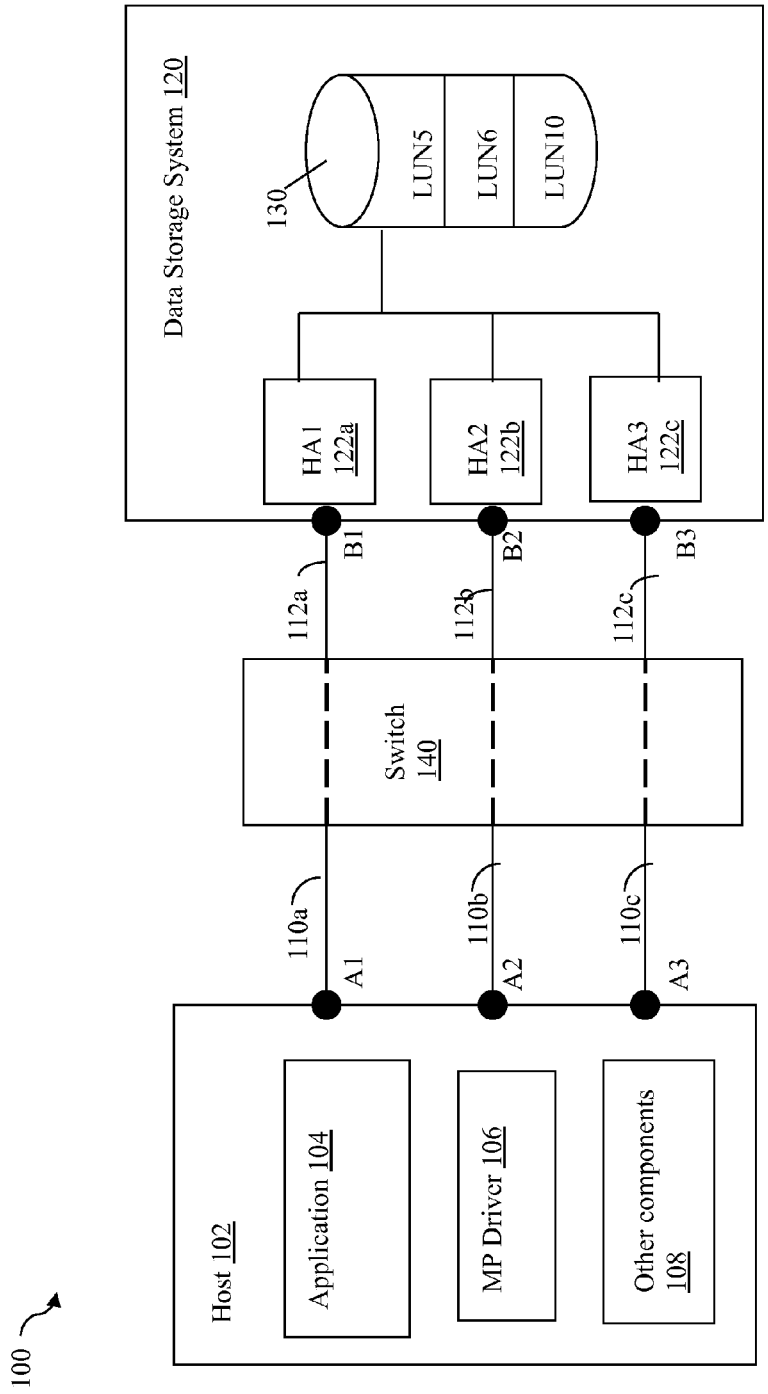
FIG. 3 is an example of a system that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The MP driver 106 may be included a commercially available product such as, for example, EMC® PowerPath® software by EMC Corporation. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC or SCSI driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, which of the multiple paths to a LUN may not be used for issuing I/O operations but may be used for issuing non I/O commands to the LUN (described in more detail elsewhere herein), and the like, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a port of an HA of the data storage system 120. Each of the LUNs of the device 130 may be accessible over three paths—a first path represented by A1-B1, a second path represented by A2-B2 and a third path represented by A3-B3.

Figure 4:
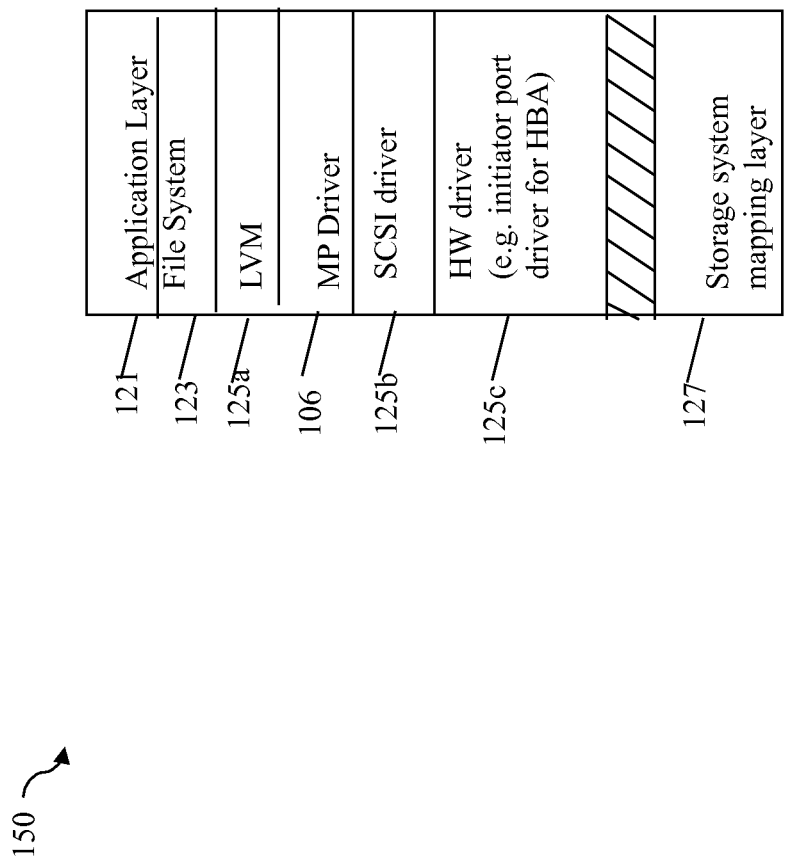
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3. The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as EMC® PowerPath® software. Functionality for performing multipathing operations such as may be performed by EMC® PowerPath® software may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI driver 125b and a hardware (HW) driver 125c. The SCSI driver 125b may handle processing of a received I/O request from the MP driver 106 such as related to forming a request in accordance with the SCSI standard. The driver 125c may be a HW driver that facilitates communication with hardware on the host. The driver 125c may be, for example, a driver for an HBA of the host which sends commands or requests to the data storage system and also receives responses and other communications from the data storage system.

It should be noted that an embodiment may also include mapping layers as in FIG. 4 with a variation that the ordering of the MP driver 106 and SCSI driver 125b may be reversed.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may executed in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a.

In connection with an embodiment in accordance with techniques herein, communications between an initiator port of the host and a target port of a data storage system may include those related to I/O operations and other non-I/O commands such as related to host control operations. I/O operations may include, for example, read and write operations. Host control operations may include those commands which are not performing I/O with respect to a data storage device (e.g., LUN) and include SCSI command such as, for example, INQUIRY, MODE SENSE (10), READ CAPACITY (16), and the like, which may be issued by the host in connection with discovery and configuration processing such as when the host is booting, coming online, inquiring further information such as in response to an error condition, I/O operation failure, and the like.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

In an embodiment in accordance with techniques herein, a state may be associated with a path with respect to a particular device. A path may have an associated state referred to as unavailable indicating that the path is not in use or available for I/O operations directed to that particular device. When a path is in such a state, the path may not be used for sending I/O operations directed to that device. When the path is in the unavailable state, the data storage system including the device may return an error status indicating a failure for any I/O operations which are sent over the path and directed to the particular device. The unavailable state may be communicated by the data storage system, such as a data storage array including the device, to a host, or more generally, an initiator using techniques herein. The unavailable state may indicate that the data storage system is currently not accepting I/O operations for the device on that particular path. When in this unavailable state, the device and path (including components such as ports, physical connections, and the like) may be healthy and operable. However, the data storage system is indicating via this unavailable state restricted usage of a particular path with respect to I/O operations directed to the device. Thus, the state of unavailable with respect to the path and device may be communicated by the data storage system to the host, or component thereon such as the driver, in any suitable manner some of which are described herein, thereby allowing the host to detect the unavailable state for the device and path combination. An active state with respect to a path and a device may refer to the state when a path is used for sending I/O operations to the device. A path for a device may transition between active and unavailable states, as well as possibly other optional states that may be included in an embodiment. When in the unavailable state with respect to a particular path and LUN combination, the path may be designated as inactive or not available for sending I/O operations to the LUN. When a path is in the unavailable state with respect to a particular LUN, the path may be indicated as available only for use in performing host control operations (e.g., inquiry, mode sense, read capacity, etc.) directed to the LUN. If an I/O operation is received at the data storage over a path for a LUN and the path and LUN combination is in the unavailable state, the data storage system may respond with an error message (e.g., responds with a check condition status code) and does not perform the requested I/O operation. When a path is in the active state with respect to a particular LUN, the path may be used to perform host read/write I/O operations (e.g., SCSI read or write operations to access host data) as well as host control operations (e.g., respond to inquiry and mode sense SCSI commands from the hosts). It should be noted that a path from a host to the data storage system over which a first LUN is visible may be in a first state, such as unavailable, and the same path over which a different, second LUN is visible may be in a second state, such as active. The unavailable state of a path with respect to a particular LUN, such as the first LUN, may indicate that although I/Os may be directed to the LUN over the path (e.g., components of the path may be healthy and functional) with the unavailable state, the data storage system will not service such I/Os thereby resulting in an error if such I/Os to the LUN are issued over the path. In contrast, the same path may have an associated state of active with respect to the second LUN indicating that I/Os directed to the second LUN over the same path will be serviced by the data storage system.

Multiple data storage systems may be aggregated into a federation. In an embodiment described herein, the data storage systems may be SCSI-based systems, such as a group of SCSI-based data storage arrays, forming a federation or federated storage environment. A SCSI based storage federation may be defined as a collection of SCSI based storage systems. An embodiment in accordance with techniques herein may include hosts and data storage systems of the federation which operate in accordance with the standard SCSI Asymmetrical Logical Unit Access (ALUA). The ALUA standard is defined in T10/SPC-4 specifies a mechanism for asymmetric or symmetric access of a logical unit. In accordance with the ALUA standard, various states may be associated with a path with respect to a particular device, such as a LUN. In particular, the ALUA standard defines such states including the active and unavailable states as described herein, where a recognized path (such as recognized by a host) over which I/Os may be issued to access data of a LUN may have an "active" state. A recognized path over which I/Os may not be issued to access data of a LUN may have an "unavailable" state. When a path to a LUN is in the unavailable state, non-I/O-based commands, such as the SCSI INQUIRY, may be issued.

In accordance with the ALUA or other suitable standard, there may be other possible path states with respect to a visible or exposed LUN as well as variations to the active state, such as active/optimized and active/non-optimized. However, for purposes of techniques herein, the path state of active may be generally any type of active state or variation whereby that active state indicates that I/Os may be issued to the LUN over the path. The active state of a path with respect to a LUN indicates that I/O operations sent on the path which are directed to the LUN are serviced. In contrast, the unavailable state of a path with respect to a LUN indicates that I/O operations sent over the path which are directed to the LUN are not serviced thereby result in an error status or condition. In the active and unavailable states, non I/O or control commands that are directed to the LUN may be sent over the path. It should be noted that in an embodiment described herein in accordance with the ALUA standard, the ALUA standard defined states of active and unavailable may map to the active and unavailable states described herein. Other standards that may be used in other embodiment may have similar concepts and states which may be mapped and used to represent the active and unavailable states described in connection with techniques herein.

Each LUN may be uniquely identified by a LUN or volume identifier (ID) such as a globally unique WWN (world wide name). Each target port may be uniquely identified with respect to all other target ports of a single data storage system using a unique target port identifier (ID). In a similar manner, each initiator port may be uniquely identified with respect to all other initiator ports using a unique initiator ID. A target port group (TPG) may be defined in accordance with the ALUA standard which is a group of one or more target ports, such as target ports of the data storage system. All ports within a TPG have the same ALUA defined state with respect to one or more LUNs accessible through the target ports of the TPG (e.g., all target ports of the same TPG are unavailable, active, and the like, with respect to the one or more LUNs accessible through the TPG). One or more LUNs may be visible or accessible through one or more TPGs.

In an embodiment described herein, the LUN WWN or LUN ID may be used by the MP driver to uniquely identify different LUNs. A first path may exist to a first LUN having a first WWN, or more generally, first volume or LUN ID. A second path may exist to a second LUN having a second WWN, or more generally, second volume or LUN ID. If the foregoing first and second volume or LUN IDs are the same, then it may be determined that the foregoing first and second paths are different paths to the same LUN. Thus, multiple paths to the same LUN may be identified whereby such paths are each providing access to the same volume or LUN ID.

In connection with a federated storage environment, it may be desirable to migrate data of a LUN from an origin data storage system (DS) to a destination DS. It should be noted that the origin DS and destination DS may be the same or different type of physical storage array. For example, the origin DS may be a first physical type of data storage array and the destination DS may be a later model array that is a second physical type different from the first type. For example, the origin DS may be a VNX™ data storage system by EMC Corporation and the destination DS may be a Symmetrix VMAX™ data storage system by EMC Corporation. It should be noted that the origin and target DSs may be by the same or different vendors.

In connection with this migration, it may be desirable in an embodiment in accordance with techniques herein to perform such migration without disruption or in a seamless manner with respect to an application on a host which issues I/Os to the LUN that is migrated from the origin DS to the destination DS. As part of this migration, the federation level identity of the LUN is also migrated from the origin DS to the destination DS. The federation level identity of a LUN may be defined using one or more items of identifying information. In at least one embodiment, an federation level identity of a LUN may be defined using a vendor identifier (VID), a product (PID) and a LUN or volume identifier (ID) where the VID and PID are identifiers denoting membership or participation in the storage federation and the LUN or volume ID may be an identifier that uniquely identifies the LUN from all other LUNs in the storage federation. Each LUN may be uniquely identified by a globally unique WWN (world wide name) whereby the WWN is specified as the LUN ID. Each LUN included in the federation has a federation level identity that includes the federation level or common VID and PID and the LUN ID unique to that LUN. As described in more detail below, each LUN may also have a lower level data storage system-dependent identity that is not migrated with the LUN from the origin DS to the destination DS. Rather, the LUN may have a first data storage system-dependent identity on the origin DS and a second different data storage system-dependent identity on the destination DS. Information included in the data storage system-dependent identity of a LUN may denote the underlying physical data storage system type where the foregoing physical data storage system type of the origin DS and destination DS may be different.

In a federated storage environment, all data storage systems which are members of the federation may also have the common, federation level VID and PID denoting the storage federation membership. The federation level VID may refer to an identifier of a vendor of a data storage system. For example, a vendor ID may be "EMC" denoting EMC Corporation of Hopkinton, Mass., which is a data storage system vendor. The federation level product ID for a federated storage environment may be "FAU" identifying a federated array union, or more generally, a storage federation. Each data storage system configured as a member of the federation may have the same common federation level VID and PID. Similarly, each LUN configured on physical devices of a data storage system belonging to the federated storage environment has the common federation level VID and PID denoting the federated storage environment (e.g., VID="EMC" and PID="FAU"). The use of the common VID and PID denoting the federated storage environment indicates to the MP driver that the data storage systems having the common VID and PID are members of the federated storage environment. Although particular examples of the VID and PID are provided herein for illustration, it should be noted that any value or identifier may be used as the VID and PID whereby the combination thereof denotes membership in the federated storage environment. In this particular example, the federation level VID may denote a particular vendor and the data storage systems may be different types or models or physical storage arrays by the same vendor. As a variation, the federated storage environment may include different physical storage arrays by different vendors such as EMC Corporation and one or more other vendors. As another example, the VID used in a federated storage environment may be characterized as a vendor-neutral VID, having a value such as "ANY", "FED", or more generally any value which may not denote a particular data storage system vendor.

In connection with federated storage migration, the data of a logical device is migrated from the origin DS (such as a first data storage array) of the federated storage environment to a destination DS (such as a second data storage array) of the federated storage environment. The logical device may be a SCSI block device of data storage, such as a block-based logical device or volume also referred to herein as a LUN.

As described herein, a host may send the I/O commands to a data storage system upon which the logical device is located. The host may be able to send the I/O commands over multiple paths between the host and data storage system of the federation. Thus, the host may have a multipath (MP) I/O driver which may automatically select from the different possible paths over which to send each of the I/O commands to the logical device. The path selected by the MP driver for sending an I/O may be based on one or more different criteria. The criteria used for path selection, and/or the particular path selected for sending an I/O, may vary with the type of the underlying physical data storage system providing the physical storage upon which the logical device's data is stored. For example, the MP driver may use different load balancing policies and may select a particular load balancing policy to use that varies with the particular physical data storage system type to which I/Os of the logical device are sent. A load balancing policy is a policy that may be used to select one of the multiple possible paths between the host and data storage system where the selected path is used to send an I/O to the logical device having its data stored on the data storage system. The MP driver may support multiple different types of physical data storage systems that may exist in the federation. Thus, the MP driver may include code which selects an appropriate and suitable load balancing policy that may vary with the particular physical data storage system type to which an I/O is directed. For example, different types of data storage systems may include an EMC Symmetrix™ data storage system, an EMC CLARiiON™ data storage system, and an EMC VNX™ data storage system. As described in more detail elsewhere herein, the type of physical data storage system upon which a LUN is located may be identified using one or more items of information comprising the LUN's data storage system-dependent identity.

As a result of migrating data of a logical device from the origin DS to the destination DS, the underlying type of the physical data storage system upon which the logical device is located may change. In such a case when the type of the destination DS including the migrated logical device is different from the type of the origin DS, the MP driver may also accordingly modify the load balancing policy used for path selection. Such policy modification may be performed responsive to detection of path state changes (described below) in connection with migration of the logical device to the destination DS. Prior to completing the migration, I/Os directed to the logical device may be sent to the origin DS which is a first type of data storage system. Path selection for sending the I/Os to the origin DS may be based on a first load balancing policy whereby the first load balancing policy is selected from multiple possible policies and the first load balancing policy is determined as optimal for use with the first type of data storage system. After completing the migration, I/Os directed to the logical device may be sent to the destination DS which is a second type of data storage system different from the first type. Path selection for sending the I/Os to the destination DS may be based on a second load balancing policy (different from the first policy) whereby the second load balancing policy is selected from multiple possible policies and the second load balancing policy is determined as optimal for use with the second type of data storage system. Thus, code of the MP driver may select the particular load balancing policy based on the type of data storage system to which I/Os of a logical device are directed. As the underlying physical storage system including the logical device changes from the origin DS to the destination DS, the MP driver may accordingly update the selected load balancing policy used for path selection when sending I/Os to the logical device whereby such policy may be modified from the first to the second load balancing policy as described above. The particular load balancing policy selection made for different physical data storage system types may be more generally referred to as an example of an optimization or setting selection made by the MP driver. Other different optimizations or settings may be selected by the MP driver code based on, and may vary with, the particular type of physical data storage system to which I/Os are directed.

The MP driver may detect when the underlying physical storage system to which the MP driver sends I/Os for a particular logical device is changing or cutting over in connection with the above-mentioned migration (of the logical device from the origin DS to the destination DS). The MP driver may detect the migration "cutover" for the logical device from the origin DS to the destination DS based on state changes with respect to paths to the logical device. Prior to the cutover, the logical device and all its data are included in the origin DS and the MP driver uses paths to the origin DS to send I/Os to the logical device. After the cutover, the logical device and all its data have been migrated to the destination DS and the MP driver uses paths to the destination DS to send I/Os to the logical device. Prior to the cutover, recognized paths to the logical device in the origin DS may have an active state indicating that I/Os to the logical device may be sent over those paths. Prior to the cutover, recognized paths to the logical device in the destination DS system may have an unavailable state indicating that I/Os to the logical device may not be sent over those paths. After the cutover, recognized paths to the logical device in the origin DS may transition to an unavailable state indicating that I/Os to the logical device may not be sent over those paths. After the cutover, recognized paths to the logical device in the destination DS may transition to an active state indicating that I/Os to the logical device may be sent over those paths. Thus, the specific trigger that may be used for detecting that a cutover to the destination DS is occurring is when the state of at least one path to the logical device between the host and destination DS transitions to the active state. Different possible states (e.g., such as the active and unavailable states mentioned above) for a path to a logical device may be defined in accordance with the ALUA or other standard that may be used in a embodiment. As will be described in more detail below, the ALUA state for such paths may be returned by the Report Target Port Group (RTPG) SCSI command.

The MP driver may thus perform processing to detect when the state of at least one path to the logical device between the host and destination DS transitions to the active state. Responsive to detecting such a state change with respect to paths to the logical device, the MP driver may perform processing to use the appropriate load balancing policy selection in accordance with the particular physical data storage system type of the destination DS. Prior to such a state change being detected, the load balancing policy used may be that policy determined as optimal for the particular physical type of data storage system of the origin DS. Use of such techniques makes it possible to dynamically set and modify the load balancing policy at the time of migration cutover where the policy selected may vary with the underlying physical data storage system to which I/Os are directed. More generally, other parameters and metadata important to the functioning of the MP driver in the data path may also be dynamically updated at the point of cutover. Even more generally, such techniques herein may be used to set any suitable parameter or option or otherwise update any necessary data or selections that may vary with the particular physical type of data storage system to which I/Os are directed.

In at least one embodiment, the MP driver may include two levels of data storage system-specific code (DSC). In a federated data storage environment, the MP driver may include a first module or library of federated DSC which handles most MP functions for all types of supported physical data storage systems in the storage federation. At cutover time or at any other suitable time at which data storage system-dependent parameters are to be updated, the foregoing first module or library may invoke another second module or library of DSC code based on the particular physical data storage system type. The second module or library may include code to select and set the optimal load balancing policy for different types of physical data storage systems. The second module or library may also set the other parameters as mentioned above which may vary with the particular physical data storage system to which I/Os are directed for a particular logical device. In one embodiment, the MP driver may include a different instance of the above-mentioned second module or library for each of the different supported types of physical data storage systems and the first module or library may suitably invoke code of the appropriate instance of the second module dependent on the particular type of physical data storage system. The MP driver may determine the particular underlying physical data storage system including a path to the logical device by issuing the SCSI inquiry VPD page 0x8B command over the path to the logical device. The response to this SCSI inquiry VPD page 0x8B command returns information identifying the underlying type of physical data storage system to which the command was sent. Additional commands that may be used to obtain information for use with techniques herein, as well as further detail regarding other aspects of the above techniques, are described in following paragraphs.

The following example may refer to particulars, such as migrating data of a single LUN (e.g., LUN A), a single host initiator port, two target ports in a data storage system, only a single host, and the like, for simplification of illustration. It will be appreciated that the hosts and data storage systems in actual use may be similarly configured for greater complexity. For example, the data storage systems may be configured with many LUNs, more target ports, and the like, such that the migration of data from the origin DS to the destination DS may include migrating more than a single LUN of data whereby the LUN may be visible to the host, as well as multiple hosts, over more paths (e.g., due to more target ports and also more initiator ports) than is included in the simplified example herein. Additionally, it should be noted that although a host is referred to herein, more generally, the host is an example of a client of the data storage system and such techniques herein may be more generally used in connection with any suitable client.

Additionally, it should be noted that an embodiment may also handle or allow additional cases than described in the example below for illustration purposes. For example, the same data storage system may return different values for the VID and/or PID for different LUNs allowing for a compatibility mode for MP drivers which do not include code for use within a federated storage environment.

Figure 5:
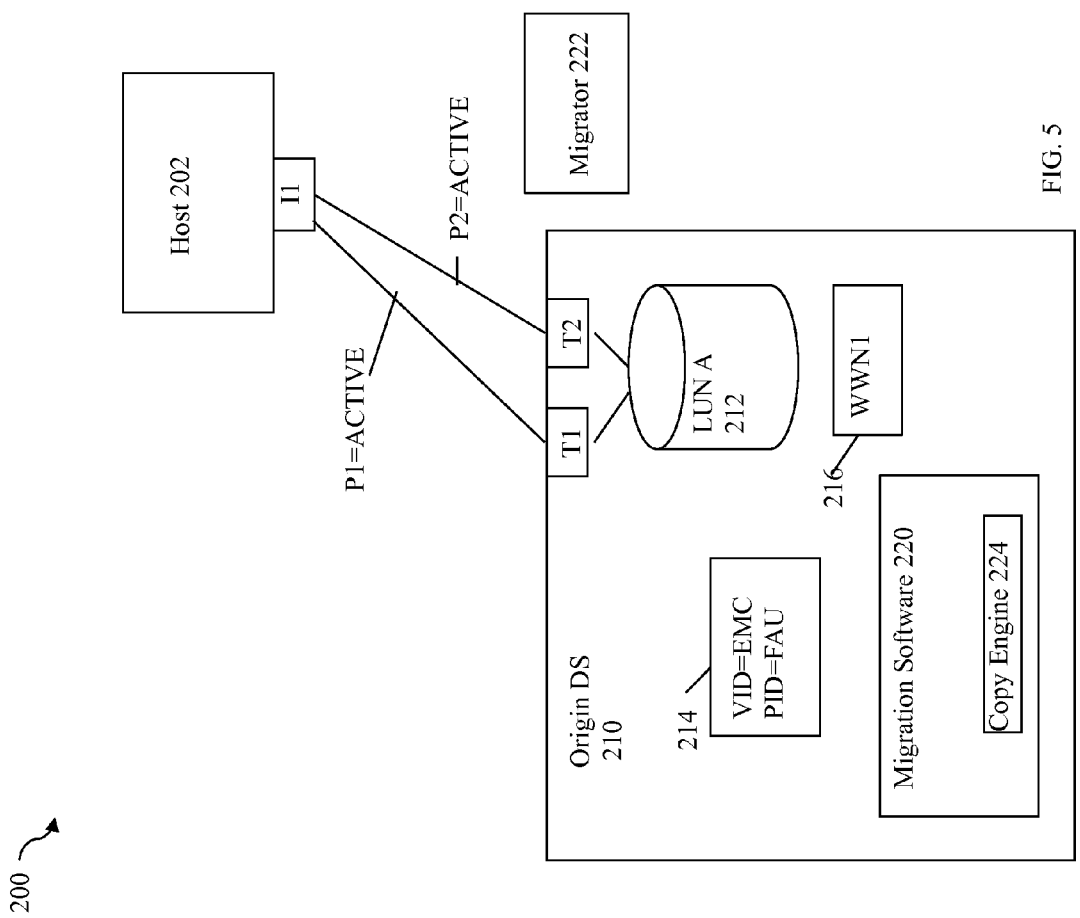
FIGS. 5-10 are examples illustrating steps in connection with performing migration processing in an embodiment in accordance with techniques herein.

At a first point in time, with reference to FIG. 5, only the origin DS and not the destination DS may be a member of the storage federation. The example 200 includes host 202 and origin DS 210. Host 202 may include an initiator port I1 and origin DS may include two target ports T1 and T2 over which LUN A 212 is exposed or visible to the host 202. P1 and P2 denote the two paths from I1 to T1 and I1 to T2 over which LUN A 212 is visible to the host. At this first point in time, paths from the host 202 to the origin DS 210 over which the LUN A is visible may be discovered and recognized by the host 202. Such paths P1 and P2 between the host 202 and the origin DS 210 over which the LUN A is visible may have a state of active. The origin DS 210 is configured as a member of the storage federation to have identifying information 214 with a VID="EMC" and PID="FAU". The LUN A 212 may be configured with identifying information 216 to have a LUN ID of WWN1 (denoting a world wide unique name).

Also illustrated in FIG. 5 is the migrator component 222 and the migration software 220 of the origin DS, which includes copy engine 224. The migrator 222 may be characterized as code which controls or orchestrates the migration process including the actual copying of data from the origin DS to a destination DS. The migrator 222 may communicate with the origin DS and destination DS as needed, the copy engine 224 to perform this data copying such as in connection with processing performed to copy data of LUN A 212 from the origin DS 210 to a destination DS 310, and the like, as described in more detail below. In this example, the migrator 222 which controls the migration processing may run on a separate server and communicate with the data storage systems and other components as needed to perform the processing described herein. However, it should be noted other embodiments in accordance with techniques herein may generally vary the location of components from as illustrated in FIG. 5. For example, the migrator 222 may be included in the origin DS 210. The foregoing and other suitable variations will be appreciated by those skilled in the art.

Figure 6:
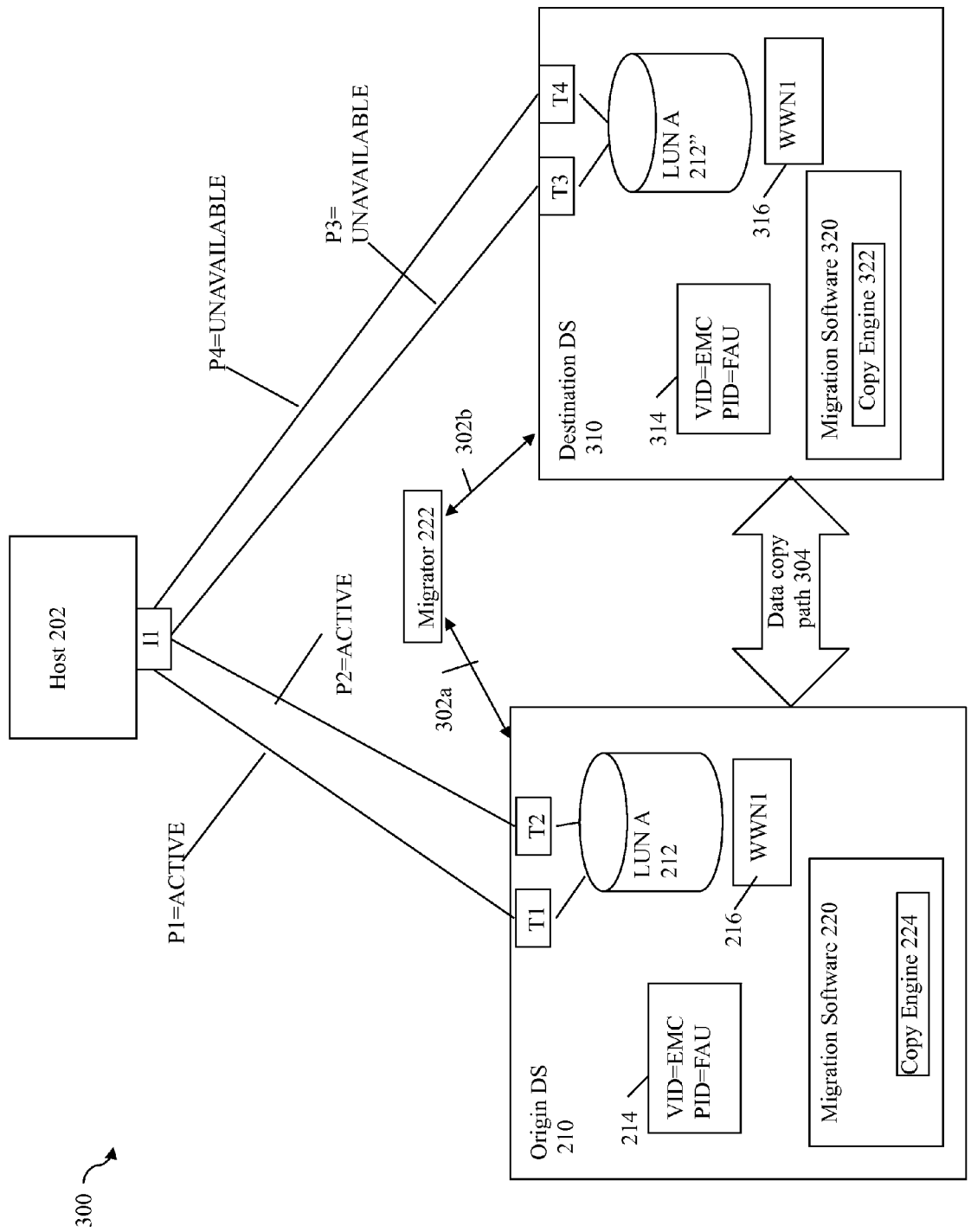

With reference to FIG. 6, at a second point in time, a destination DS 310 may be configured and brought online as part of the federation. At this second point in time, the origin DS is as described above in connection with the example 200 with the addition of the destination DS 310. The destination DS 310 is configured to have identifying information 314 with a VID="EMC" and PID="FAU" denoting that the destination DS 310 is a member of the same storage federation as the origin DS 210. Additionally, the destination DS 310 is also configured to have a LUN, LUN A 212", with identifying information 316. In this case, LUNA 212" is configured to have the LUN ID of WWN1, the same LUN ID as in the origin DS 210. From the host perspective, the LUN A 212 of origin DS 210 and LUN A 212" of the destination DS 310 are identified as the same LUN since both 212 and 212" are configured to have the same LUN ID. The destination DS 310 includes target ports T3 and T4 over which LUN A 212" is exposed. P3 and P4 denote the two paths from I1 to T3 and I1 to T4 over which LUN A 212" is visible to the host.

At this second point in time, paths from the host 202 to the destination DS 310 over which the LUN A 212" is visible may be discovered and recognized by the host 202. Such paths P3 and P4 between the host 202 and the destination DS 310 over which the LUN A 212" is visible may have a state of unavailable thereby indicating that I/O commands may not be sent to LUN A 212" over such paths. At this second point in time, the host has performed discovery to recognize paths from the host to the destination DS over which LUN A 212" is visible. However at this second point in time, I/Os may not be issued over such paths P3, P4 to LUN A 212" from the host 202 to the destination DS 310. From the point of view of host 202 at this second point in time, there are 4 paths, P1, P2, P3 and P4, to the same LUN, LUN A. The 2 paths, P1 and P2, from the host to the origin DS, over which LUN A is visible, are active. Additionally, the 2 paths, P3 and P4, from the host to the destination DS, over which LUN A is visible, are unavailable. It should be noted that the destination DS 310 and LUN A 212" are configured as described above prior to exposing LUN A 212" over paths P3 and P4 with an unavailable state to the host 202.

The destination DS 310 includes migration software 320 which may communicate with the migrator 222 and the migration software 220 of the origin DS to perform processing to migrate LUN A 212 of origin DS to the destination DS 310. Such processing may be as described in connection with the example 300 and other figures and description herein. The migration software 320 may include a copy engine 322 which communicates with copy engine 224 and migrator 222 to copy data from the origin DS 210 to destination DS 310 whereby such copying may be controlled by migrator 222. In an embodiment in accordance with techniques herein, the migrator 222 may generally control or orchestrate processing described herein to configure the destination DS 310 and to facilitate copying the data from the origin DS 210 to destination DS 310. Such processing may include, for example, configuring the destination DS 310 as a member of the federated storage environment to have identifying information 314, configuring the LUN A 212" to have the LUN ID WWN1 as represented by 316, transitioning paths P1-P4 to various states at different points in time, copying the data for LUN A 212 from origin DS to destination DS, and the like. Elements 302a and 302b may collectively represent the control path over which messages are sent, respectively, between the migrator 222 and the origin DS 210 and between the migrator and destination DS 310 to control the migration processing, configure the destination DS 310 and LUN A 212", and the like. Element 304 may represent the data copy path over which the data for LUN A 212 is copied from the origin DS 210 to the destination DS 310. For example, the data path 304 may be used by copy engines 224 and 322 to copy data of LUN A 212 from the origin DS 210 to the destination DS 310. It should be noted that the data copy path, denoted by element 304, may be distinguished from the typical data path used in connection with I/Os issued to a data storage system, such as 210, from the host 202.

Figure 7:
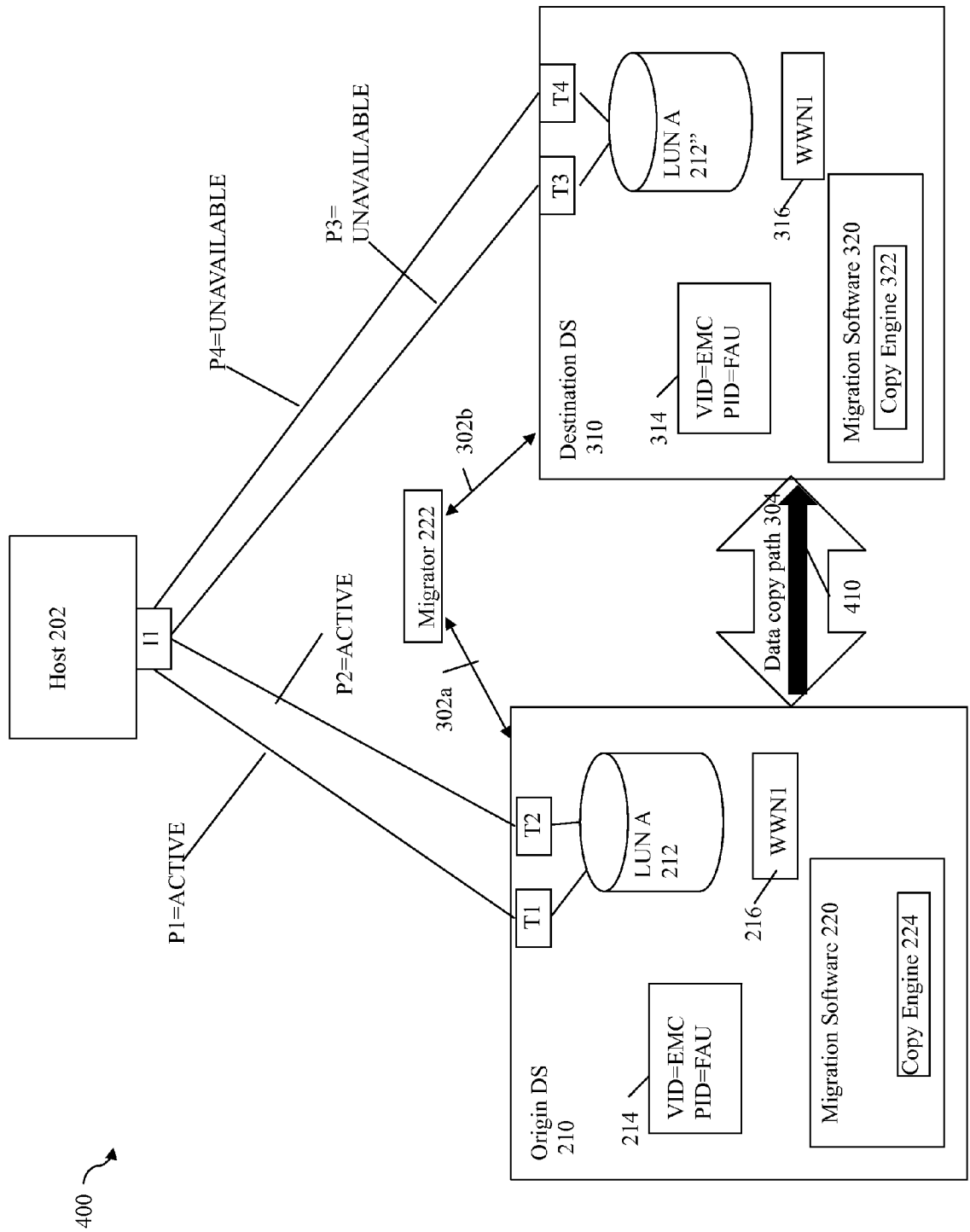

At a third point in time with reference to FIG. 7, processing may be performed to copy or migrate data for LUN A 212 from the origin DS 210 to the destination DS 310. Arrow 410 represents the copying of LUN A 212's data from the origin DS 210 to the destination DS 310 over data copy path 304. Additionally, the control path 302a between the migrator 222 and the origin DS 210 and the control path 302b between the migrator 222 and the destination DS 310 may be used by the migrator 222 to issue commands. For example, the migrator 222 may issue commands to copy engine 322 over 302b and/or copy engine 224 over 302a in connection with controlling the copying operation processing.

Figure 8:
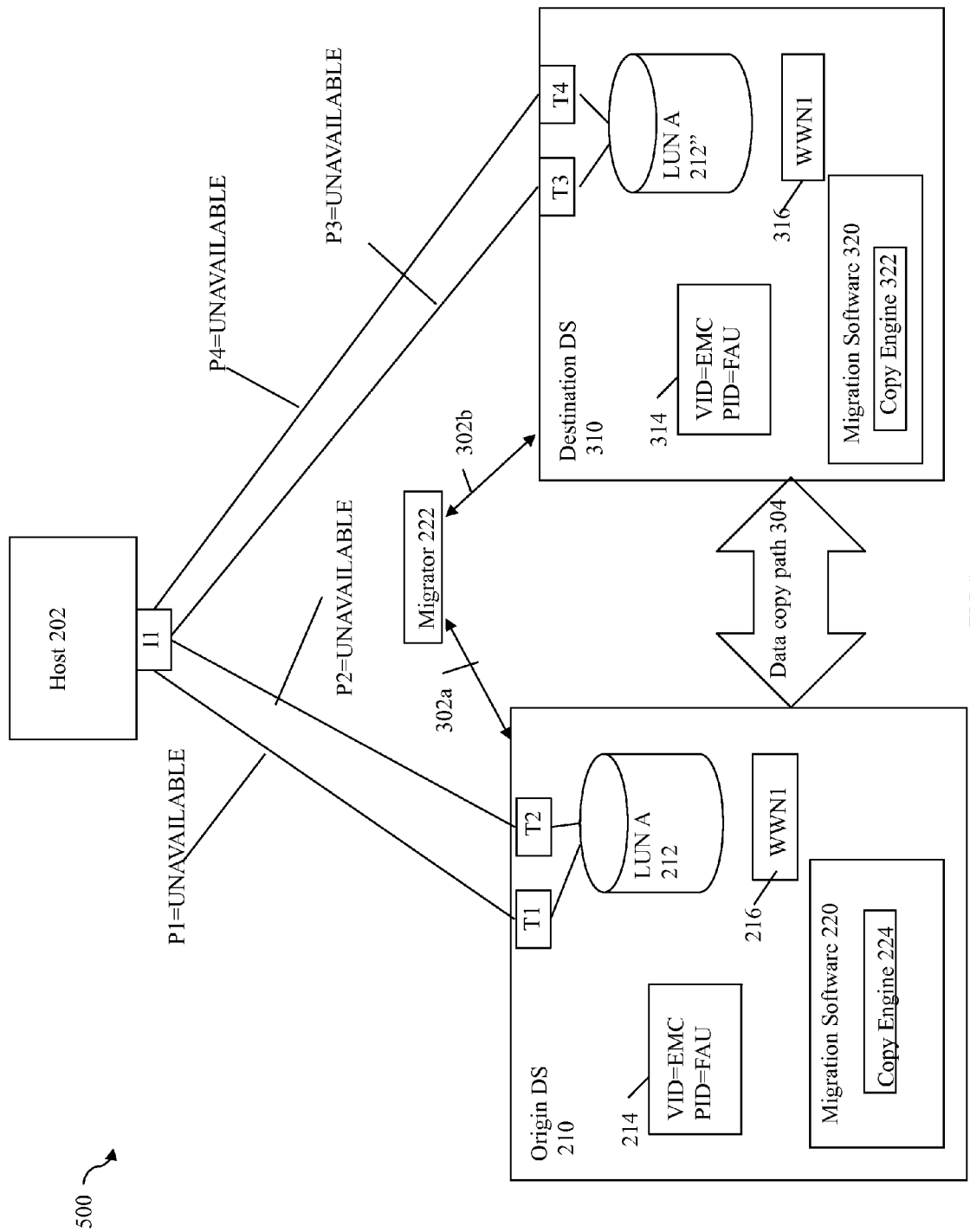

At a fourth point in time with reference to FIG. 8, the migration of the data for LUN A 212 from the origin DS 210 to the destination DS 310 may be almost completed and there may be outstanding or in-flight I/Os issued to LUN A 212 over paths P1 and/or P2 which have not yet completed. At this point, cutover processing may be commenced. Prior to cutover processing, P1-P4 have associated states as described in connection with FIG. 7 such that I/Os directed to LUN A are issued over paths P1, P2 to the origin DS 210 and such I/Os are performed with respect to the copy of LUN A's data 212 on the origin DS 210. After cutover processing has been performed, I/Os for LUN A are directed to the destination DS 310 and such I/Os are performed using the migrated copy of LUN A 212". After cutover processing, more generally, both I/O and non-I/O commands or requests directed to LUN A may be serviced using the paths P3 and P4 between the host and the destination DS 310 since, as described below, such paths P3 and P4 transition to the active state with respect to LUN A. Additionally, as also described below, after cutover processing, paths P1 and P2 transition to the unavailable state with respect to LUN A such that only non I/O commands or requests sent over P1 and P2 directed to LUN A are serviced (e.g., issuing I/O commands over P1 and P2 to LUN A result in an error and are not serviced by the data storage system). Generally, during cutover processing, the states associated with using paths P1, P2 to the origin DS for requests directed to LUN A transition to unavailable thereby causing I/Os to LUN A over these paths to result in error. Additionally, during cutover processing, the states associated with using paths P3, P4 to the destination DS for requests directed to LUN A transition to active thereby causing I/Os to LUN A over these paths to now be serviced by the destination DS.

At the beginning of cutover processing at the fourth point in time, the paths P1 and P2 over which LUN A is visible transition from active to unavailable states as illustrated in FIG. 8. Thus, all paths P1-P4 over which LUN A is visible are unavailable. At this fourth point in time on the host when all paths P1-P4 to LUN A are unavailable, the MP driver discovers that all paths to LUN A are in an unavailable state and will hold (e.g. not issue to any data storage system) any subsequent application I/Os directed to LUN A. The MP driver may detect or be notified of the transition of paths P1 and P2 for LUN A from active to unavailable by an error condition that may be returned to the host for any outstanding or new I/Os to LUN A issued over paths P1 and P2 once such paths transition to the unavailable state with respect to LUN A. Such error conditions may be, for example a unit attention condition or a check condition. A unit attention is a condition in the target requiring the initiator's attention. A unit attention (UA) condition in SCSI terms may be generally characterized as a way in which the data storage system notifies the host (or initiator thereof) about one or more particular conditions requiring attention. In accordance with the SCSI standard, an error return for a command may be used to signal the unit attention and sense data may be used to communicate the information that there is a unit attention condition and also provide more specific information regarding the particular unit attention condition.

As known in the art in connection with SCSI standards, CHECK CONDITION is one possible status that may be returned or indicated by the data storage system in response to a request by the host, or more generally, an initiator, to perform a command. Generally, a status of check condition may indicate that the requested command was not successfully executed (e.g., an error occurred when executing the command or that the command was not executed).

Thus, upon receiving an error condition and related status information for I/Os issued to LUN A over paths P1 and P2, the MP driver may be notified regarding the unavailable state for paths P1 and P2 to access LUN A.

While all paths P1-P4 for LUN A are in the unavailable state, any remaining processing on the data storage system side needed to complete the migration may be performed. For example, such remaining processing may include completing any remaining data synchronization between the migrated copy of LUN A's data 212" on the destination DS 310 with original copy of LUN A's data 212 on the origin DS 210. Such remaining processing may also include, for example, updating any remaining metadata and other SCSI state information regarding the migrated LUN A 212" on the destination DS 310. Once any remaining processing has completed at a fifth point in time with reference to FIG. 9, paths P3 and P4 to LUN A 212" may transition from unavailable to active.

Figure 10:
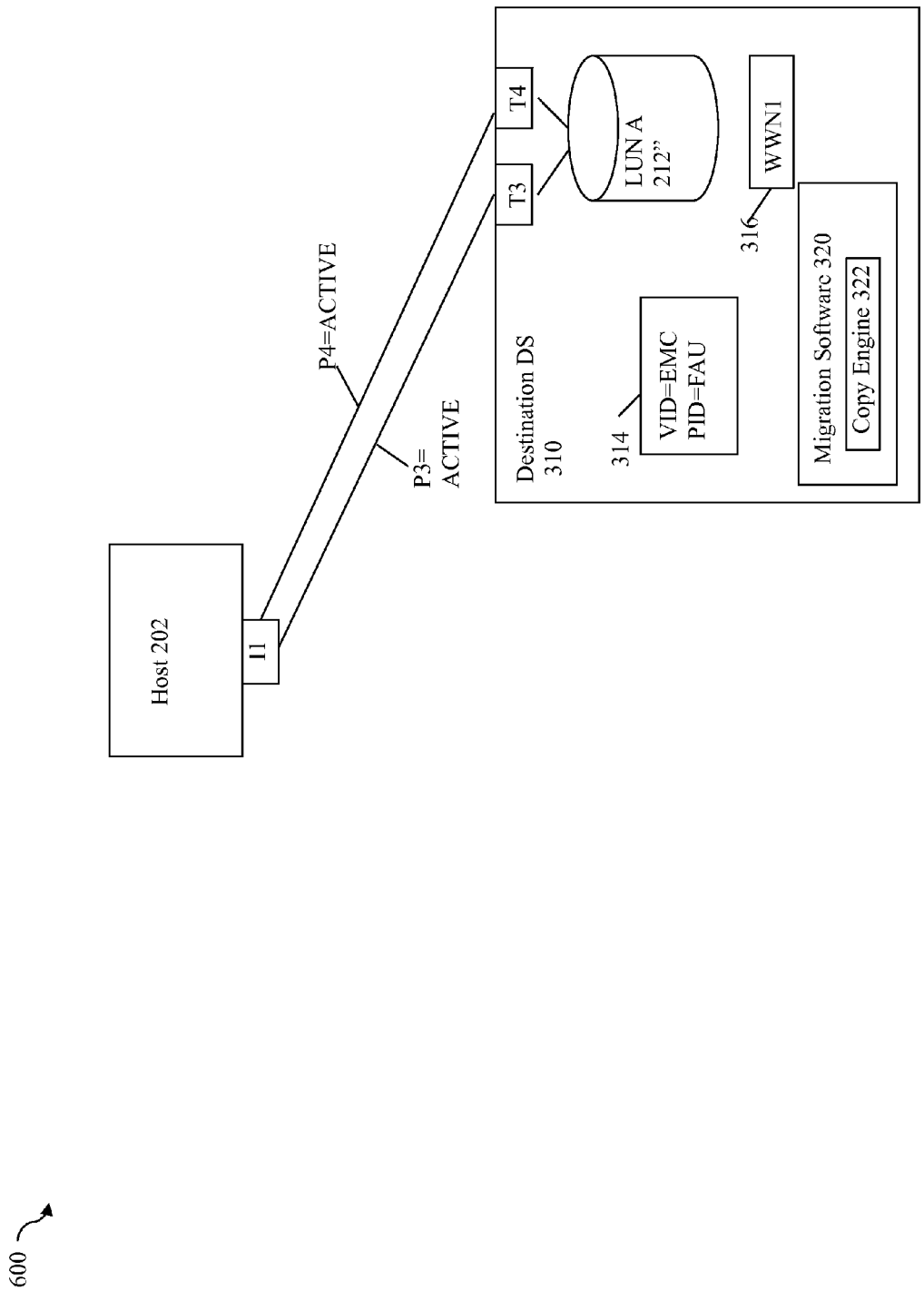

Referring to FIG. 10, at a sixth point in time after paths P3 and P4 to LUN A 212" transition to active, the origin DS 210, and thus also the associated paths P1 and P2 to LUN A, may be removed from the federated storage environment as illustrated in the example 600

Figure 9:
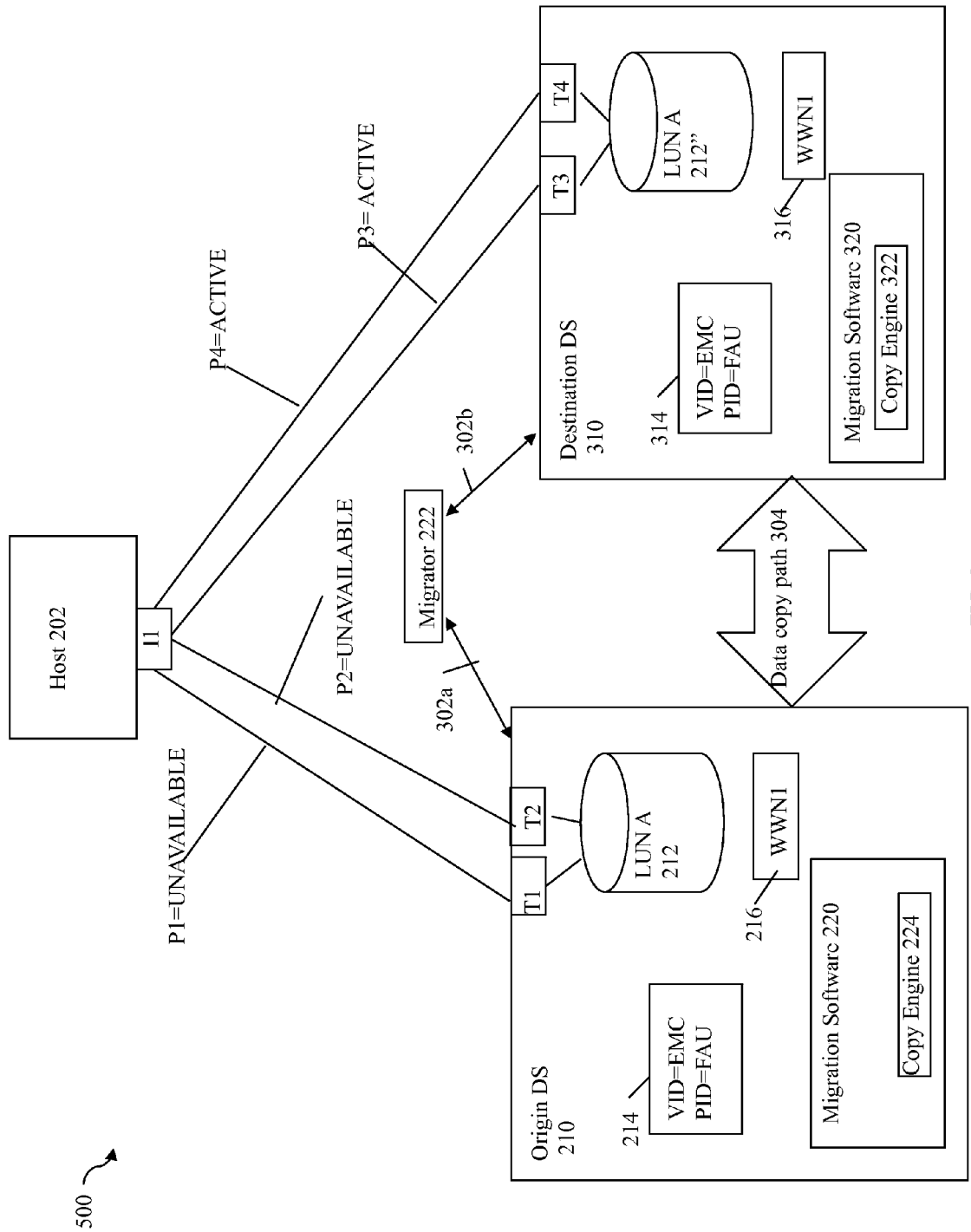

After the fifth point in time such as illustrated in the example 500 of FIG. 9, the cutover processing to the destination DS has completed and the MP driver on the host may recognize the state transition to active for paths P3 and P4 to LUN A. The MP driver may now resume issuing I/Os to LUN A whereby such I/Os are now issued to LUN A over active paths P3 and P4 between the host 202 and the destination DS 310. Such I/Os issued may include any I/Os being held at the host due to all paths to LUN A being previously unavailable.

It should be noted that when the MP driver detects all recognized paths to LUN A are unavailable, subsequent I/Os may be held on the host and not issued to any data storage system as described above. Additionally, the MP driver may periodically issue one or more suitable commands to LUN A over the various paths P1-P4 to determine whether there is any further state change to any of the paths P1-P4 for LUN A. In this manner, the MP driver may discover the state transition from unavailable to active for accessing LUN A over paths P3 and P4 between the host and destination DS. When all recognized paths P1-P4 to LUN A are unavailable, the MP driver may also set a timer denoting a maximum amount of time that the MP driver will hold such I/Os. Such maximum amount of time may be based on an expected amount of time for cutover processing to complete whereby paths P3 and P4 for LUN A transition from unavailable to active. If no path to LUN A transitions from unavailable to active prior to the maximum amount of time elapsing, an error or other suitable status condition may be returned to the issuing application. Holding I/Os in connection with techniques herein for no more than the maximum amount of time noted above may ensure that an application does not wait an unacceptably long time period for a held I/O operation to complete. It may be that a path for a LUN is in an unavailable state for a reason other than in connection with processing described herein and may therefore not transition to the active state if such path for a LUN is unavailable for a different reason.

To summarize path state transitions for the origin DS and destination DS described above with respect to requests over such paths directed to LUN A (which is being migrated), the following representation may be used showing path states with respect to LUN A as (origin DS, destination DS). Note that the arrow denotes a transition from the states on the left side of the arrow to the resulting states on the right side of the arrow:

S1: (Active, NULL)→(Active, Unavailable)
S2: (Active, Unavailable)→(Unavailable, Unavailable)
S3: (Unavailable, Unavailable)→(Unavailable, Active)
S4: (Unavailable, Active)—)→(NULL, Active).

In the above state transition S1, (Active, NULL) on the left side of the arrow denotes a starting state where paths from the host to the origin DS for LUN A are active and there are no visible paths (e.g. NULL) to LUN A from the host to the destination DS such as illustrated in FIG. 5. The right side of arrow denotes the ending transition state (Active, Unavailable) where the destination DS comes online thereby providing paths to the LUN A between the host and destination DS having a state of Unavailable such as illustrated in FIG. 6. Thus, S1 may represent the path state transitions from that as illustrated by FIG. 5 to FIG. 6. FIGS. 6 and 7 have the same path states.

In the above, state transition S2 denotes the path state transition from that as illustrated by FIG. 7(*left* side of transition arrow) to FIG. 8 (having path states represented by the right side of the transition arrow). FIG. 7 may have path states as represented by (Active, Unavailable) where paths to LUN A from the host to the origin DS are active and paths to LUN A from the host to the destination DS are unavailable. FIG. 8 may have path states as represented by (Unavailable, Unavailable) where paths to LUN A from the host to the origin DS are unavailable and paths to LUN A from the host to the destination DS are unavailable.

In the above, state transition S3 denotes the path state transition from that as illustrated by FIG. 8 (left side of transition arrow) to FIG. 9 (having path states represented by the right side of the transition arrow). FIG. 8 may have path states as represented by (Unavailable, Unavailable) where paths to LUN A from the host to the origin DS are unavailable and paths to LUN A from the host to the destination DS are unavailable. FIG. 9 may have path states as represented by (Unavailable, Active) where paths to LUN A from the host to the origin DS are unavailable and paths to LUN A from the host to the destination DS are active.

In the above, state transition S4 denotes the path state transition from that as illustrated by FIG. 9 (left side of transition arrow) to FIG. 10 (having path states represented by the right side of the transition arrow). FIG. 9 may have path states as represented by (Unavailable, Active) where paths to LUN A from the host to the origin DS are unavailable and paths to LUN A from the host to the destination DS are active. FIG. 10 may have path states as represented by (NULL, Active) where paths to LUN A from the host to the origin DS are NULL since the origin DS is removed and paths to LUN A from the host to the destination DS are active.

In connection with techniques herein, software, such as the MP driver, executed on the host may determine that cutover processing to use the destination DS has completed for at least one path to a migrated LUN, such as LUN A. Responsive to determining that cutover processing to the destination DS has completed for at least one path for a migrated LUN, such as LUN A, processing may be performed by the host's MP driver to update one or more optimization parameters that may vary due to the origin DS to the destination DS being different types of physical data storage systems. As described herein, after completion of cutover processing, the destination DS is used for servicing I/Os rather than the origin DS and the origin DS may be taken offline.

The MP driver may detect the occurrence of a trigger event whereby the trigger event is a state transition from unavailable to active for one or more of the paths P3 and P4 over which LUN A is visible on the destination DS. The foregoing path state change may denote that a cutover is occurring between the origin DS and the destination DS whereby the migration processing is now transitioning or switching to the destination DS rather than the origin DS for the migrated LUN A data. After cutover processing, I/Os and other commands directed to LUN A are serviced using the destination DS. Responsive to the occurrence of the trigger event, the MP driver may perform processing to accordingly update any one or more optimization parameters used by the MP driver if the origin DS is a different type of physical data storage system than the destination DS. It may be the case, for example, that different parameters denoting different policies, values, settings, and the like, may be used for different types of physical data storage systems. As such, once data for a LUN has been migrated from the origin DS to the destination DS, such optimization parameters may be updated in accordance with the underlying physical data storage system type of the destination DS.

In an embodiment, various SCSI commands may be used to obtain information for use with techniques herein. For example, the federation level VID/PID are included in response data/payload returned in response to a SCSI standard inquiry command (e.g., standard inquiry command 0x12; EVPD bit set to 0). The particular command format is described in more detail elsewhere herein and also known in the art and the SCSI standard. The LUN ID is included in response data/payload returned in response to a VPD (vital page data command) page 0x83 command (inquiry command 0x12; EVPD bit set to 1; PAGE CODE byte set to 0x83). It should be generally noted that the particular data items referenced herein as being included in a response may be returned along with other information in the response payload.

Consistent with description elsewhere herein, the federation level VID/PID returned in the response to the standard inquiry command and the LUN ID returned in the response to the VPD page 0x83 command do not change or vary when the physical data storage system upon which the LUN is stored changes within the federated storage environment. For example, LUN A may be located on origin DS 210 and a first standard inquiry command and first VPD page 0x83 command are issued to LUN A over path P1. In response to the first standard inquiry command, a VID and PID may be obtained. In response to the first VPD page 0x83 command, a first LUN ID for LUN A may be obtained. As described above, path P3 over which LUN A is visible may be discovered by the host and a second standard inquiry command and second VPD page 0x83 command are issued to LUN A over path P3. In response to the second standard inquiry command, a VID and PID may be obtained which is the same VID and PID as returned in response to the first standard inquiry command previously issued to LUN A over path P1. In response to the second VPD page 0x83 command, a second LUN ID for LUN A may be obtained which is the same as the first LUN ID as returned in response to the first VPD page 0x83 command issued to LUN A over path P1.

In one aspect, the LUN, such as LUN A, may be characterized as having a federation level identity which is generic within the storage federation and remains the same regardless of where the LUN A is physically located within the federated storage environment (e.g., LUN A has the same federation level identity independent of which appliance or physical data storage system providing the physical storage for LUN A). Such federation level identifying information for the LUN may include the VID and PID returned by the standard inquiry command whereby such VID and PID information denote membership in the federated storage environment. Such federation level identifying information for the LUN may also include the LUN ID, such as the WWN, returned in response to VPD page 0x83 command, denoting the LUN's identifier used to identify the particular LUN regardless of where the LUN is physically located within the federated storage environment. In connection with migrating a LUN within the federation from a first data storage system to a second data storage system, the LUN's federation level identity is migrated from the first to the second data storage system such as described herein. However, as described below and elsewhere herein, the LUN may also be characterized as a having a lower level identity dependent on the physical data storage system upon which storage for the LUN is provisioned whereby such lower level identity (also referred to herein as data storage dependent identity) is not migrated with the LUN when the LUN is relocated or migrated between different data storage systems.

A LUN, such as LUN A, may also be characterized as having a data storage system level identity or data storage dependent identity that varies with the particular underlying physical data storage system within the federated storage environment upon which the LUN is located (e.g., varies with the physical data storage system providing the backing physical storage for the LUN).

The Device Constituents VPD page 0x8B command (inquiry command 0x12; EVPD bit set to 1; PAGE CODE byte set to 0x8B) reports data relative to the underlying physical data storage system. Thus, the information returned in response to this command varies with the physical data storage system upon which the LUN's data is located within the federated storage environment and may represent the LUN's data storage system dependent identity that changes as the LUN may be migrated to different physical data storage systems within the federated storage environment. For example, the Device Constituents VPD page 0x8B command when issued to a LUN over a path may return information including the VID and PID and physical volume identifier information relative to the particular underlying physical data storage system. At the data storage system specific level, the VID may represent the data storage system vendor of the underlying physical data storage system and the PID may represent the particular type or model of physical data storage system. For example, in response to the Device Constituents VPD page 0x8B command issued to a LUN on a path from an initiator of a host to a target port of a data storage system, the response returned may include a VID such as "EMC" denoting the data storage system vendor as EMC Corporation, and a PID such as "VNX" or "SYMMETRIX" denoting, respectively, a VNX™ data storage system or a Symmetrix™ data storage system, both by EMC Corporation. Thus, the VID and PID returned in response to the Device Constituents VPD page 0x8B command does not denote the federated storage environment but rather identifies the physical data storage system. The VID and PID of the physical storage domain level may be used to identify the type of physical data storage system providing physical storage for the LUN.

Thus, a LUN may be identified using its federation level identifying information and also its data storage system dependent level identifying information. A LUN's data storage system dependent level identifying information may include the VID and PID information returned in response to the Device Constituents VPD page 0x8B command identifying characteristics regarding the underlying physical data storage system upon which the LUN is configured. The VID and the PID may be used to identify the type of physical data storage system including a particular LUN and may be used to select one or more MP optimization parameters that may vary with the type of physical data storage system.

In one embodiment, the MP optimization parameters selected may include selection of a load balancing policy. Thus, the preferred load balancing policy used by the MP driver in selecting one of possibly multiple paths over which to send an I/O operation directed to a LUN may vary with the underlying physical data storage system upon which the LUN is stored (e.g., may vary with the underlying physical data storage system to which the I/O is directed).

For example, following are load balancing policies from which one may be selected by the MP driver based on the underlying physical data storage system upon which the LUN is provisioned. The load balancing policies may include multiple policies that make a selection of a path from possible multiple paths based on the current load of the different multiple possible paths. The policies may include a least-blocks load balancing policy where the load balancing is based on the number of blocks of all pending or outstanding I/Os on the different paths to the same LUN. A path from multiple paths to a LUN may be selected for sending an I/O request based on which of the multiple paths has the smallest load or burden in terms of total blocks of such pending I/Os regardless of the number of pending I/O requests.

The load balancing policies may include a least-I/Os load balancing policy where the load balancing is based on the number of pending or outstanding I/Os on the different paths to the same LUN. A path from multiple paths to a LUN may be selected for sending an I/O request based on which of the multiple paths has the smallest number of pending I/Os regardless of the size or number of blocks of the pending I/Os.

The load balancing policies may include a stream I/O load balancing policy which attempts to improve the performance of sequential I/O operations. For each possible path for an I/O to a particular LUN, this policy selects the same path as was selected for the previous I/O to the LUN, unless the LUN's I/O count on such last selected path exceeds a threshold value. When the threshold is exceeded, the policy selects a new path. Such new path selection may be based on the load of each possible path to the LUN. The LUN I/O count is re-initialized to zero on each path change.

It should be noted that different policies such as those example mentioned herein may be based on load for the particular LUN over the path. Alternatively, such policies may determine load based on the total load for any/all LUNs over a particular initiator-target (I-T) nexus and may select a path for a particular LUN based on the different I-T nexus total loads.

Generally, any suitable load balancing policies may be used in an embodiment in accordance with techniques herein. Some examples of such load balancing policies are described, for example, in U.S. Pat. No. 6,434,637, Issued Aug. 13, 2002 to D'Errico, METHOD AND APPARATUS FOR BALANCING WORKLOAD AMONG PATHS IN A MULTI-PATH COMPUTER SYSTEM BASED ON THE STATE OF PREVIOUS I/O OPERATIONS, which is incorporated by reference herein.

As a further illustration, the load balancing policies may include a first load balancing policy used by the MP driver whereby the first load balancing policy is optimized for path selection when sending an I/O operation to a LUN having storage provisioned on a VNX data storage system by EMC Corporation. The load balancing policies may include a second load balancing policy used by the MP driver whereby the second load balancing policy is optimized for path selection when sending an I/O operation to a LUN having storage provisioned on a Symmetrix data storage system by EMC Corporation. load balancing policies may include a third load balancing policy used by the MP driver whereby the third load balancing policy is optimized for path selection when sending an I/O operation to a LUN having storage provisioned on a first type of physical data storage system by Hitachi Data Systems. The origin DS 210 for LUN A as described herein may be the first type of physical data storage system by Hitachi Data Systems whereby the first type of physical data storage system is identified by the VID and PID returned in response to the Device Constituents VPD page 0x8B command as described above. The destination DS 310 for LUN A as described herein may be the Symmetrix data storage system by EMC Corporation identified by the VID="EMC" and PID="SYMMETRIX" returned in response to the Device Constituents VPD page 0x8B command as described above. In accordance with techniques herein, the MP driver may use the first load balancing policy for path selection when sending an I/O operation to LUN A when its storage is provisioned on the first type of physical data storage system by Hitachi Data Systems. In accordance with techniques herein, the MP driver may detect the occurrence of the trigger event when one or more paths to LUN A from the host to the destination DS transition from unavailable to active. Responsive to the foregoing trigger event occurring, processing may be performed on the host to update the load balancing policy used by the MP driver. When LUN A has its storage provisioned on the origin DS that is the foregoing Hitachi data storage system, the above-mentioned third load balancing policy may be used for path selection. Subsequent to detecting the trigger event occurrence, the load balancing policy for path selection may be updated to use the above-mentioned second load balancing policy for path selection optimized for sending I/Os to the Symmetrix data storage system since LUN A has been migrated to the destination DS that is a Symmetrix data storage system.

Figure 11:
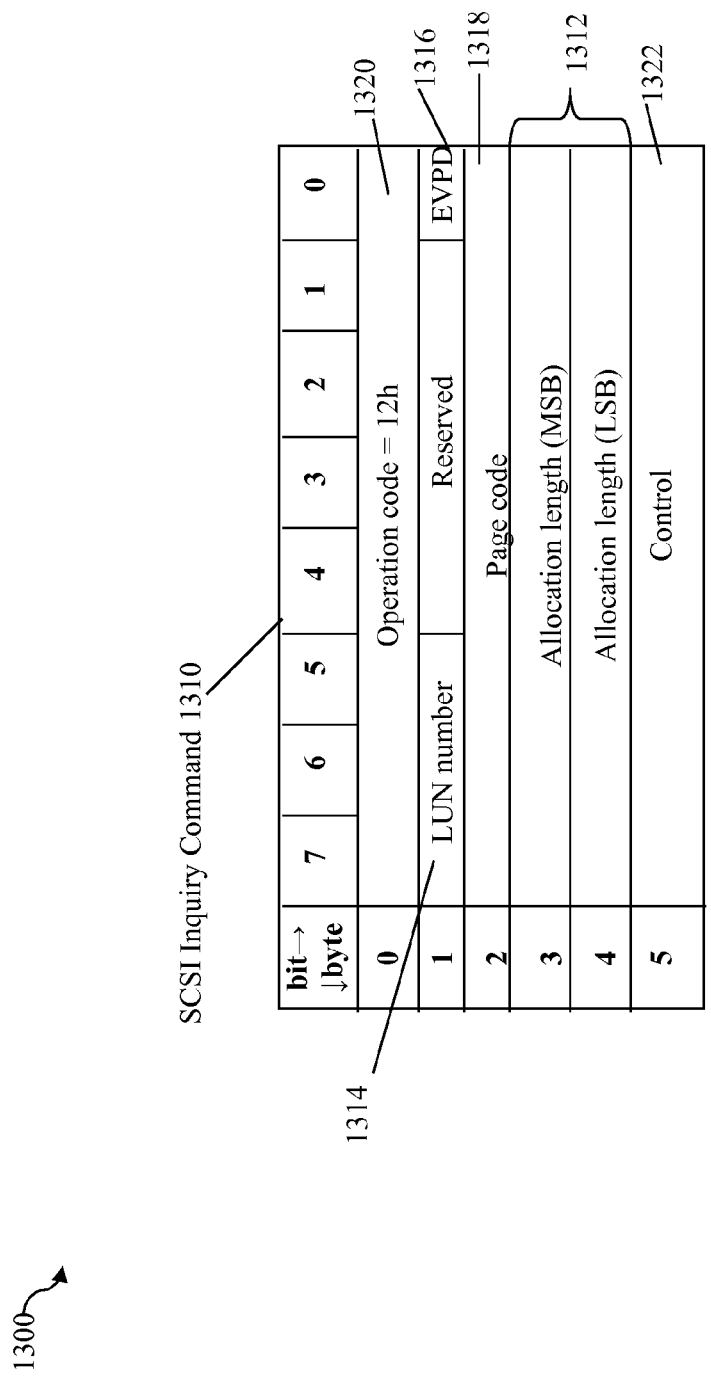
FIG. 11 is an example of a command block that may be used in an embodiment in accordance with techniques herein.

Referring to FIG. 11, shown is an example of a command data block or payload of a SCSI command as may be used in an embodiment in accordance with techniques herein. The SCSI inquiry command 1310 may include data in accordance with the illustrated format. A message in accordance with format 1310 may be sent by the host to the data storage system whereby such command may be directed to a particular LUN on a particular path from the host to the data storage system. The command 1310 may specify the following fields: operation code 1320 (e.g. indicating the inquiry command code), a LUN number 1314, EVPD (e.g., vital product data) indicator 1316, page code 1318, allocation length 1312, and control 1322. The format of 1310 is in accordance with the SCSI standard. The standard page 0 inquiry command as described herein has the page code field 1318 set to 0 and the EVPD field 316=0. A standard page 0 inquiry command may be sent as part of the sequence of instructions mentioned above for path recognition such as performed during discovery when a new path exposing one or more LUNs becomes visible to the host.

The allocation length fields 1312 specify an upper bound or maximum size of the response payload that may be returned by the data storage system as described in more detail below. In connection with 1312, MSB denotes the most significant byte of the allocation length and LSB denotes the least significant byte of the allocation length. The EVPD field 1316 in combination with the page code field 1318 identify the type and amount of information that is returned in the response. Additionally, certain portions of the format are indicated as reserved in accordance with the SCSI standard. As will be appreciated by those skilled in the art, suitable data for the other fields may be specified even though not discussed in detail herein.

The EVPD and page code fields of the inquiry command block 1310 may be set to different values to return different sets of information. For example as described herein, the standard inquiry command may be used to obtain the federation level VID and PID where such standard inquiry command sets the page code and EVPD to 0. The VPD page 0x83 command is the inquiry command block with the EVPD set to 1 and the page code byte set to 0x83. The VPD page 0x8B command is the inquiry command block with the EVPD set to 1 and the page code byte set to 0x8B.

Referring to FIG. 12, shown is an example of a data format of a response to the inquiry command as may be used in an embodiment in accordance with techniques herein. The particular data included in the payload response varies with the different inquiry command block as may be denoted using different values for fields of the command block 1300 such as, for example, different values for the LUN, EVPD and page code fields in 1300. The example 1350 illustrates a format in accordance with the SCSI standard for the payload portion of a response message. A message in accordance with format 1352 may be returned to the host by the data storage system. As represented by the variable byte offset field indicators 1351, the size of the response payload to the inquiry command may vary depending on the length of the vendor specific parameters field 1356. Element 1351 denotes the field 1356 as having a last byte located at any offset from 96 to N (e.g., field 1356 may be 1 or more bytes). As described above in connection with FIG. 11, the inquiry command may specify an allocation length 1312 indicating a maximum size of the payload of the response (e.g., the maximum size of the data returned having format 1352). The response 1352 may include the additional length field 1354 that specifies the actual length in bytes of the parameters or following data. Thus, field 1354 indicates the actual size of the response payload following field 1354. The value indicated by field 1354+4 bytes should not exceed the maximum size specified by the allocation length 1312 of 1300 in an embodiment denoting byte locations or offsets which are zero-based.

An embodiment of the MP driver may include a hierarchy of code modules that parallels the federated storage environment level and data storage system dependent level identifying information for a LUN.

Figure 13:
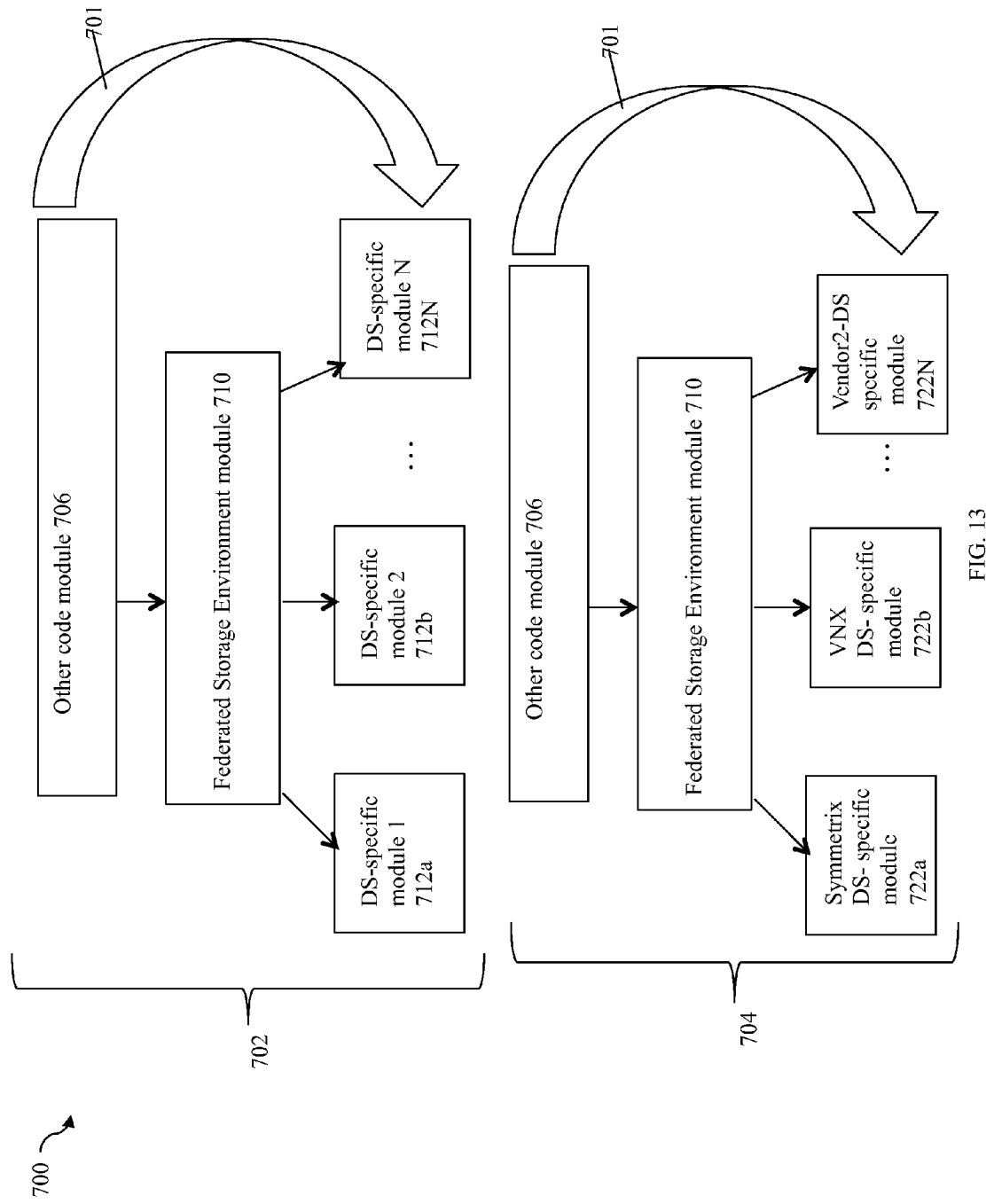
FIG. 13 is an example of modules that may be included in a multi-path driver in an embodiment in accordance with techniques herein.

With reference to FIG. 13, element 702 includes a hierarchy of code modules that may be included in the MP driver in an embodiment in accordance with techniques herein. The example 702 includes a federated storage environment module 710, DS-specific code modules 712a-N and also other code module 706. It should be noted that code module 706 may generally represent a code module included in the MP driver which either directly invokes an appropriate one of the DS-specific modules 712a-N or directly invokes the federated storage environment module 710 (whereby module 710 may then invoke an appropriate one of the DS-specific modules 712a-N).

Generally, the code module 706 may be code of the MP driver which directly invokes module 710 for processing in connection with those LUNs included in a federated storage environment. As described herein, whether a LUN is a member of, or included in, a federated storage environment may be determined using the VID and PID returned in response to the standard inquiry command. As described herein, the VID and PID returned in response to the standard inquiry command may have particular values denoting federation membership (e.g., federation level identifying information) if the LUN is included in a federation. Subsequently, module 710 may invoke an appropriate one of the DS specific modules 712a-N for processing depending on the particular physical type of data storage system upon which a LUN is located. As described elsewhere herein, the physical type of underlying data storage system upon which the LUN is located may be determined based on the VID and PID returned in response to the Device Constituents VPD page 0X8B command.

Alternatively, it may be the case that a LUN is not included in, or a member of, a federated storage environment (e.g., if the VID and PID returned by the standard inquiry command do not denote federation level identifying information and are therefore not equal to the particular values denoting federation membership). In this case, the module 706 may directly invoke 701 an appropriate one of the DS-specific modules 712a-N since the VID and PID returned by the standard inquiry command may be used to identify the appropriate type of physical data storage system.

Each of the N DS-specific modules 712a-N may include code which selects one or more optimization parameters for a particular type of physical data storage system. For example, each of the DS-specific modules 712a-N may include code that selects the load balancing policy and possibly one or more other optimizations parameters based on a particular type of physical data storage system. In accordance with techniques herein, each of the N modules 712a-N may select such optimization parameters for one of N possible types of physical data storage systems whereby the destination DS may be any one of such N physical data storage system types.

Code module 710 may be executed in connection with performing processing within a federated storage environment whereby such processing may include, for example, selection and setting of optimization parameters used by the MP driver as well as other processing. Code module 710 may determine the occurrence of the trigger event as described elsewhere herein when at least one path for a LUN from the host to the destination DS has transitioned to the active state. In response to the occurrence of the trigger event, the code module 710 may perform processing to obtain information identifying the physical data storage system type of the destination DS. As described herein, such information may include the VID and PID obtained by the host in response to issuing the Device Constituents VPD page 0x8B command to the LUN on a path from the host to the destination DS. The origin DS may be a first physical data storage system type and the load balancing and other optimization parameters may currently be set based on the first type. The destination DS may be a second physical data storage system type different from the first physical data storage system type. In this case, the federated storage environment module 710 invokes the particular one of the modules 712a-N which selects the load balancing policy and other optimization parameters for the second physical data storage system type. Control may be returned to the module 710 after the particular one of the modules 712a-N accordingly selects the optimization parameters. In one embodiment, the modules 712a-N may select the one or more parameters, such as load balancing policy, that may vary with the physical data storage system type and return such selected parameter values to the caller, the module 710. Code of the module 710 may then further perform processing to make these selections active or in use by the MP driver. As a variation, invoking any of the modules 712a-N may select the one or more parameters, such as load balancing policy, that may vary with the physical data storage system type and also make such selections the active parameter values used by MP driver. In this latter cause, the modules 712-N may both select and set parameter values used by the MP driver rather than return such selected values to module 710.

Element 704 is a more detailed example of the module hierarchy that may be included in an embodiment of the MP driver. The example 704 includes element 701 and modules 706 and 710 as described above in connection with element 702. Modules 722a-N may represent particular examples of the DS-specific modules. For example, modules 722a and 722b may be DS specific modules for different types of data storage systems provided by EMC Corporation. The DS specific module 722a may include code that selects optimization parameters for the Symmetrix data storage system by EMC Corporation. DS specific module 722b may include code that selects optimization parameters for the VNX data storage system by EMC Corporation. DS specific module 722N may include code that selects optimization parameters for a particular type of physical data storage system by a vendor other than EMC Corporation (denoted generally as "vendor 2"). As described above in connection with element 702, the module 706 may directly invoke a particular one of the modules 722a-N or may directly invoke module 710 (which may subsequently invoke one of the modules 722a-N).

Figure 14:
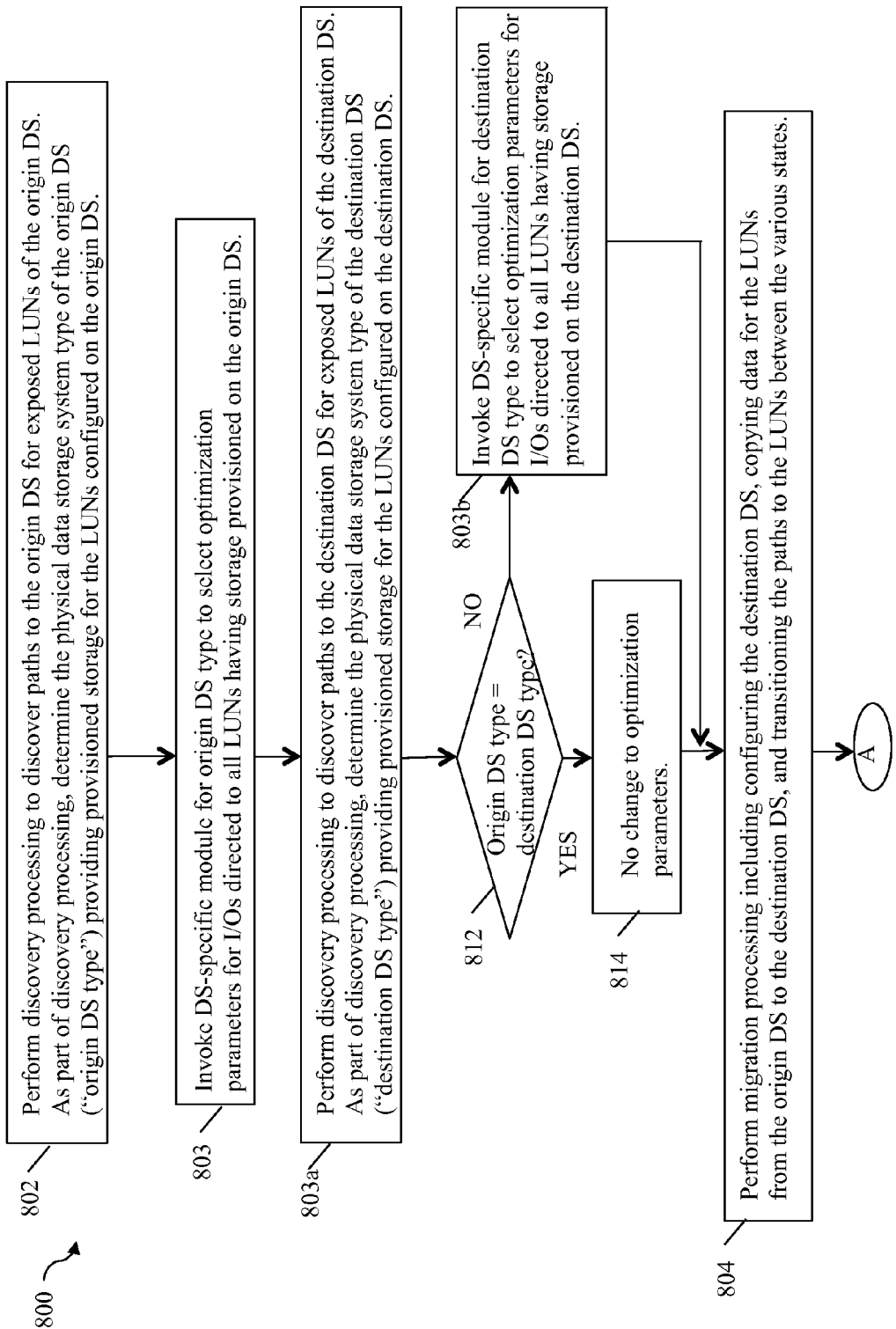
FIGS. 14-15 are flowcharts of processing steps that may be performed in an embodiment in accordance with techniques herein.
Figure 15:
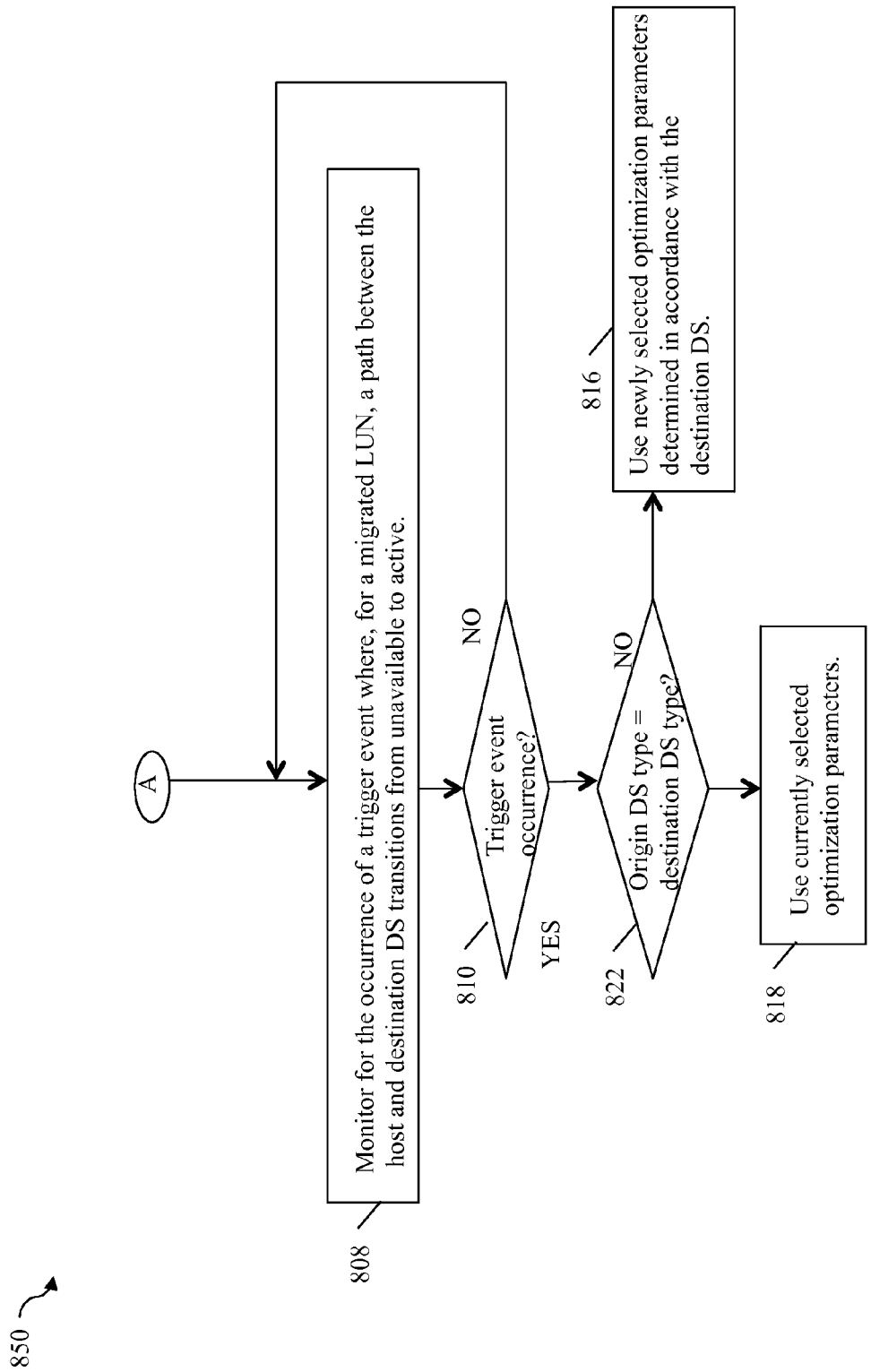

Referring to FIGS. 14 and 15, shown are flowcharts of processing steps that may be performed in an embodiment in accordance with techniques herein. The flowchart 800 summarizes processing described above that may be performed by the host and its MP driver. At step 802, discovery processing may be performed by the host with respect to LUNs of the origin DS exposed over paths between the host and origin DS. Step 802 and the state of the storage federation may be as illustrated in FIG. 5. Step 802 includes the host issuing a standard inquiry command to each LUN exposed over all paths between the host and origin DS. Put another way, the standard inquiry command may be issued with respect to each I-T-L (initiator-target port-LUN) combination or nexus where initiators are those of the host, the target ports are those of the origin DS and the LUNs are those of the origin DS exposed over the origin DS target ports. As described elsewhere herein, the standard inquiry command returns information including the federation level VID and PID denoting that the LUN and the data storage system upon which the LUN is provisioned are included in a storage federation and identifies whether the data storage system supports the ALUA standard.

Step 802 discovery processing may include issuing a VPD page 0x83 command to obtain the LUN ID, such as the WWN for the LUN. The federation level identifying information for each LUN may include the federation level VID and PID as returned by the standard inquiry command and also the LUN ID as returned by the VPD page 0x83 command for the LUN. The current state, such as the ALUA state, of each path over which a particular LUN is exposed (e.g., each I-T-L nexus including the LUN) may be obtained. In one embodiment, the path state for a particular LUN may be determined using the report target port group (RTPG) command. Each target port may be uniquely identified with respect to all other target ports in a single data storage system using a unique target port identifier (ID) (e.g., the target port ID may be unique with respect to all target ports of a single data storage system). A target port group (TPG) may be defined in accordance with the ALUA standard which is a group of one or more target ports, such as target ports of the data storage system. All ports within a TPG have the same ALUA defined state (e.g., all target ports of the same TPG are unavailable, active, and the like) with respect to one or more particular LUNs. One or more LUNs may be visible or accessible through one or more TPGs. As described elsewhere herein, the same TPG may have different states with respect to different groups of LUNs.

Additionally, as part of discovery processing in step 802, the physical data storage system type of the origin DS (referred to also as "origin DS type") providing provisioned storage for each LUN is determined. The origin DS type identifies the type of physical data storage system of the origin DS providing provisioned storage for the LUNs configured on the origin DS. The origin DS type may be obtained by issuing a Device Constituents VPD page 0x8B command to each LUN exposed over a path from the host to the origin DS where the LUN has storage provisioned on the origin DS.

The MP driver may store information in one or more data structures for its use describing the discovered information for each LUN.

Figure 16:
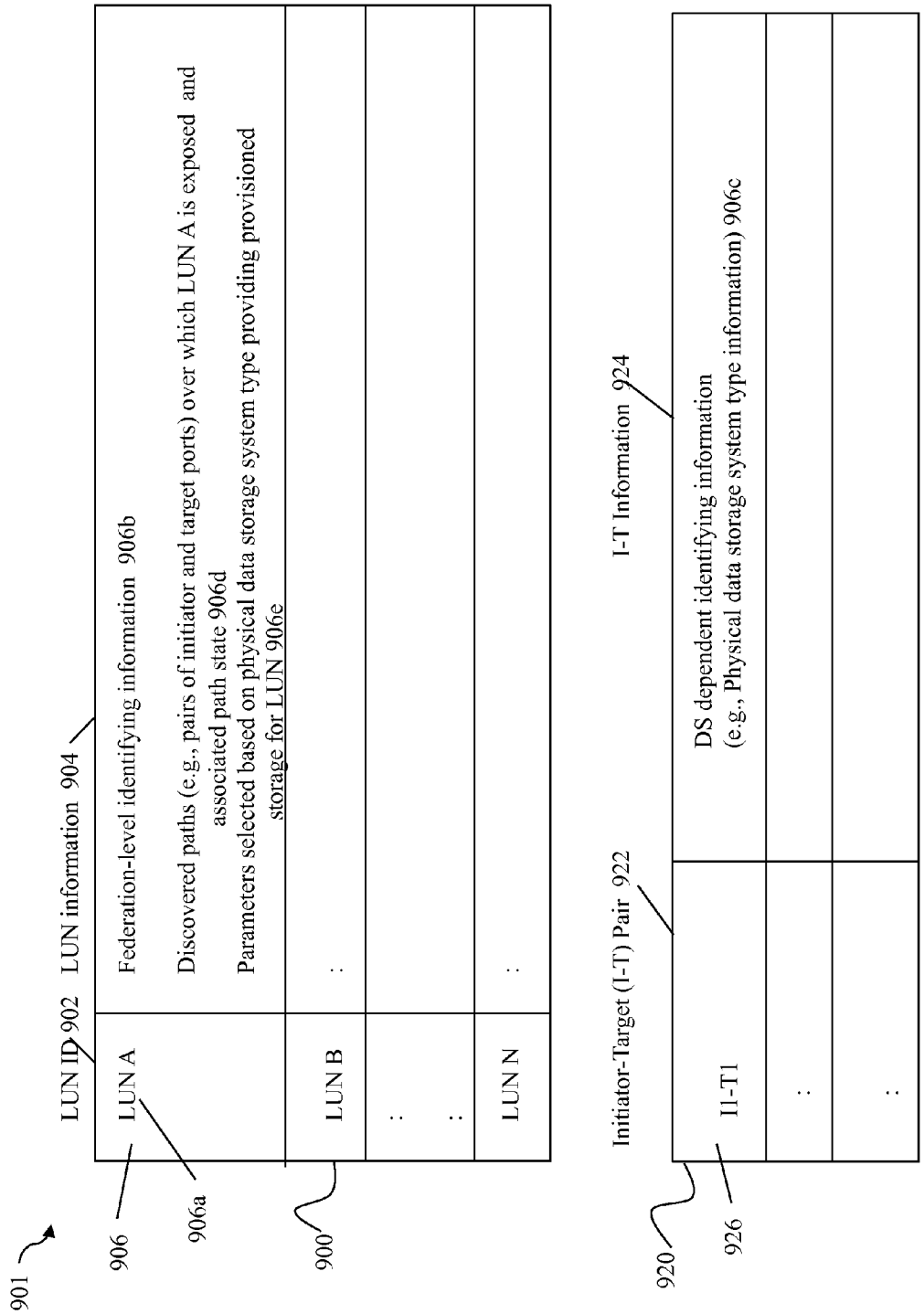
FIG. 16 is an example of information included in data structures that may be used by a multi-path driver in an embodiment in accordance with techniques herein.

Referring to FIG. 16, shown is an example 901 of information that may be included in such data structures. In this example 901, element 900 is a table including information for each discovered LUN and element 920 is a table including information for each unique combination of initiator and target (I-T) forming a path over which one or more LUNs of table 900 are visible.

The table 900 includes a column 902 of LUN IDs and a column 904 of LUN information. Each row of the table 900 includes a LUN ID and corresponding LUN information obtained such as through discovery for the LUN ID. For example, row 906 includes a LUN ID for LUN A 906a in column 902 and corresponding LUN information 906b, 906d and 906e in column 904. The LUN information for LUN A may include LUN A's federation level identifying information 906b. Such information 906b, 906d and 906e may be obtained in response to various commands issued during discovery of step 802 as described above. Specifically, the federation-level identifying information 906b may include the federation level VID and PID included in information returned in response to the standard inquiry command. The LUN ID which is also included in 906b may be returned from the VPD page 0x83 command and stored as the LUN ID in column 902 rather than being included in element 906b in this example. Element 906d may identify discovered paths (e.g., pairs of initiator and target ports) over which LUN A is exposed to the host and also an associated state for each path with respect to LUN A. Such information of 906d may include information returned in response to the standard inquiry command and the RTPG command. Element 906e may include the parameters selected by the DS-specific module based on the physical data storage system type providing provisioned storage for the LUN.

The table 920 includes a column 922 identifying a particular I-T pair included in a path over which one or more LUNs are visible to the host and I-T information 924. Each row of the table 920 may identify an I-T pair and corresponding I-T information. For example, row 926 includes I1-T1 as an I-T pair in column 922 and corresponding I-T information in column 924. The I-T information 926 for I-T Pair I1-T1 may include DS dependent identifying information 906c. The DS dependent identifying information 906c may include the VID and PID as related to the physical or data storage system dependent information for the LUN. The DS dependent information 906c may be include the physical data storage system type information returned in response to the Device Constituents VPD page 0x8B command. Such information 906c may be obtained during discovery of step 802 as described above.

It should be noted that in an embodiment in which target ports have a target ID which is unique with respect to all other target ports of a single data storage system, the same I-T pair may exist with respect to two different data storage systems. In this case, there may be a table 920 of information maintained per data storage system. In one embodiment, each data storage system may be uniquely identified from other data storage systems using a unique data storage system identifier. For example, an embodiment may use the target descriptor which uniquely identifies a data storage system where the target descriptor is included in a response payload for the VPD page 0x83 command. Additionally, with reference to element 906d of table 900, it should be noted that each of the discovered paths (e.g., pairs of initiator and target ports) over which a LUN is exposed may also include the target descriptor or other information used to identify the data storage system in order to uniquely distinguish between two I-T pairs that have the same initiator and target IDs with each pair having the same target ID in a different data storage system.

Referring back to step 802 of FIG. 14, as a result of the VID and PID values returned in response to standard inquiry command thereby denoting a federated storage environment, the MP federated storage environment module 710 may be executing which may then invoke the DS-specific module for the origin DS type at step 803 to select the load balancing policy and possibly other parameters that may vary with the physical data storage system type of the origin DS. The parameters selected by the DS-specific module based on the physical data storage system type providing provisioned storage for the LUN may be stored in the table 900 of FIG. 16 as represented by element 906e. At step 803, the DS-specific module for the origin DS type may be invoked based on the origin DS type to set the load balancing policy and possibly other optimization parameters for the LUNs configured on the origin DS. As described herein, such optimization parameters may affect the load balancing policy and other settings used in connection with path selection when sending I/Os to the LUNs having storage provisioned on the origin DS. It should be noted that the particular parameter values currently active or in use by the MP driver and other code may be as represented by 906e in table 900

It should be noted that information in the tables 900 and 920 of FIG. 16 may be updated accordingly in response to different processing steps performed, path state changes, and the like, although such updating may not be explicitly mentioned in other processing steps.

At this point with reference to the migration example and states described above, the system may be as represented in FIG. 5. Subsequently, the destination DS may be configured and brought online as represented in FIG. 6. At step 803a, discovery processing may be performed by the host with respect to LUNs of the destination DS exposed over paths between the host and destination DS. At Step 803a, the state of the storage federation may be as illustrated in FIG. 6. Step 803a discovery processing may be similar to that as described above and elsewhere herein in connection with step 802. As part of discovery processing in step 803a, processing is performed to determine the physical data storage system type of the destination DS ("destination DS type") providing provisioned storage for the LUNs configured on the destination DS.

It should be noted that the host determines that two different paths are to the same LUN based on a common LUN ID as returned by the VPD page 83 command issued on each such path. In this manner, the MP driver determines, for example with reference to FIG. 6, that paths P1 and P2 to the origin DS and also P3 and P4 to the destination DS are different paths to the same LUN.

At step 812, a determination is made as to whether the origin DS type matches (is the same as) the destination DS type. If step 812 evaluates to yes, control proceeds to step 814 where there is no change to optimization parameters since the origin DS and destination DS are the same type of physical data storage system. From step 814, control proceeds to step 804.

If step 812 evaluates to no, control proceeds to step 803b to invoke the DS-specific module for the destination DS type which sets the optimization parameters for I/Os directed to all LUNs migrated to the destination DS. At step 803b, DS-specific module for destination DS type may be invoked to select optimization parameters for I/Os directed to all LUNs having storage provisioned on the destination DS. Step 803b is similar to step 803 described above whereby the DS-specific module for the destination DS type may be invoked to set the load balancing policy and possibly other optimization parameters for the LUNs configured on the destination DS. As described herein, such optimization parameters may affect the load balancing policy and other settings used in connection with path selection when sending I/Os to the LUNs having storage provisioned on the destination DS. In step 803b, the selected optimization parameters may not be committed or stored to the table 900 of FIG. 16 yet. Rather, step 803b provides for obtaining selected parameters in advance of their actual use in response to the occurrence of a trigger condition. From step 803b, control proceeds to step 804.

At step 804, migration processing as described herein in connection with FIGS. 6-8 may be performed which includes configuring the destination DS, copying data for the LUNs from the origin DS to the destination DS, and transitioning the paths to the LUNs between the various states. After step 804 is complete, the system may be as illustrated in FIG. 8 where all paths to the LUNs being migrated as unavailable.

At step 808, processing may be performed to monitor for the occurrence of a trigger event where, for a migrated LUN, a path between the host and destination DS transitions from unavailable to active (e.g., see FIG. 9). In step 810, a determination is made as to whether there has been a trigger event occurrence. If step 810 evaluates to no, control proceeds to step 808. If step 810 evaluates to yes, control proceeds to step 822. At step 822, a determination is made as to whether the origin DS type matches (is the same as) the destination DS type. If step 822 evaluates to no, control proceeds to step 816 to use the newly selected optimization parameters determined in accordance with the destination DS (e.g., the parameters selected in step 803b).

Step 816 may include updating the information 906e in table 900 to include the newly selected parameters thereby indicating that such values are now the current or actively used parameters when sending I/Os to the particular LUNs now having storage provisioned on the destination DS rather than the origin DS. If step 822 evaluates to yes, control proceeds to step 818 where the currently selected optimized parameters may be used without modification.

It should be noted that other various ordering of the processing steps just described may be performed in an embodiment in accordance with techniques herein. For example, processing which determines the destination DS type and accordingly selects the optimization parameters based on the destination DS type may be performed subsequent to detecting the trigger event occurrence (e.g., may be performed as part of step 816 processing) rather than prior to the trigger event occurrence as just described. As another variation, processing which determines the destination DS type may be performed prior to the trigger event occurrence, such as described above, and processing that accordingly determines the optimization parameters based on the destination DS type may be performed subsequent to detecting the trigger event occurrence (e.g., may be performed as part of step 816 processing) rather than prior to the trigger event occurrence as just described. The foregoing and other orderings and variations of techniques described herein will be readily appreciated by those skilled in the art.

It should be noted more generally, techniques herein may be used to select other optimizations, features or settings responsive to detecting a state change from unavailable to active for a path to the LUN between the host and destination DS whereby such selections are based on the physical data storage system type of the destination DS. For example, write throttling may be enabled or disabled based on the physical data storage system type. Write throttling, when enabled, may delay the sending of write operations from the host to the data storage system. For example, if the data storage system performed processing which always gives priority to writes over reads to the extent that a read operation may be outstanding or pending on the data storage system for an unacceptable amount of time, the host may perform write throttling to periodically delay sending writes to the data storage system so that any pending reads already issued to the data storage system may be completed. When the data storage system performs such processing may vary with the underlying physical type of the data storage system. Accordingly, whether the host will employ such a write throttling technique may vary with the particular physical data storage system type to which I/Os are directed One or more timing parameters may have a time value selected that varies with the physical data storage system type to which I/Os are directed. For example, a first timing parameter may indicate a threshold amount of time or timeout value for the host to wait for a pending I/O sent to the data storage system to complete. After the threshold amount of time, the host may consider the I/O as failed and may reissue the I/O or take some other action. The foregoing threshold amount of time may vary with a reasonable or expected amount of time it should take for the data storage system to process the I/O request. The foregoing threshold amount of time may vary with the capabilities and characteristics particular to the underlying physical data storage system whereby such capabilities and characteristics affect the amount of time to process I/Os.

As another example, a second timing parameter may indicate a threshold amount of time to wait for paths between the host and the data storage system to transition from unavailable to active when the data storage system is being rebooted such as due to an upgrade on the data storage system. The amount of time selected for the second timing parameter may vary with the expected amount of time for the particular data storage system's upgrade to complete whereby after such upgrade is complete, paths to the data storage system transition from unavailable to active.

Described herein are techniques which include processing performed by the MP driver on the host in response to detecting that a path, over which a LUN is accessed, transitions from unavailable to active. In this case, the foregoing transition indicates that the LUN has been physically relocated from a first DS to a second DS within the federation. The foregoing description illustrates such physical relocation of the LUN between data storage systems in the context of a migration. However, more generally, techniques herein may be used to select one or more options or settings that vary with the underlying physical data storage system type to which I/Os are directed. In this manner, techniques here may be more generally applicable for use in response to physically relocating a LUN from a first DS to a second DS in contexts besides migration of an entire data storage system and its LUNs from an origin DS to a destination DS. Examples and embodiments herein may refer to SCSI-based communication and commands. However, those skilled in the art will appreciate that techniques herein may be more generally used with any suitable protocol, standard, commands, and the like.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing parameter selection comprising:
   performing first processing that migrates data of a first device from an origin data storage system to a destination data storage system, said first processing including cutover processing whereby, after said cutover processing is performed, requests to the first device are serviced by the destination data storage system and not said origin data storage system;
   detecting, during said first processing, occurrence of said cutover processing; and
   responsive to detecting the occurrence of said cutover processing, performing second processing to update one or more parameters each having a value that varies in accordance with a type of physical data storage system, wherein prior to said second processing, said one or more parameters have values determined in accordance with a type of physical data storage system associated with the origin data storage system, and wherein after said second processing, said one or more parameters have values determined in accordance with a type of physical data storage system associated with the destination data storage system.

2. The method of claim 1, wherein said origin data storage system and said destination data storage system are included in a federated storage environment.

3. The method of claim 1, wherein said one or more parameters include a first parameter identifying a load balancing policy used by a multi-path driver of a client in connection with selecting a path from a plurality of paths when the client sends I/Os directed to the first device.

4. The method of claim 3, wherein said first device is visible to the client over each of said plurality of paths.

5. The method of claim 1, wherein said one or more parameters include a parameter denoting whether to enable or disable a feature of a client sending I/Os to the first device.

6. The method of claim 1, wherein said one or more parameters include a timing parameter having a time threshold value selected in accordance with a type of physical data storage system to which I/O requests are sent.

7. The method of claim 1, wherein said detecting occurrence of said cutover processing includes detecting a state change of a path between a host and the destination data storage system over which said first device is visible to a client, wherein said state change results in said path, over which the first device is visible to the client, transitioning from a first state to an active state, wherein said active state indicates that I/O operations directed to the first device which are sent on said path are serviced.

8. The method of claim 1, wherein said first device is a logical device having a first identity, and wherein said first processing includes migrating said first identity from the origin data storage system to the destination data storage system.

9. The method of claim 8, wherein said first identity is a federation level identity of the logical device that is migrated from the origin data storage system to the destination data storage system by said first processing, said federation level identity including a logical device identifier and a first set of one or more items of data identifying the logical device as a member of a federated storage environment having its storage provisioned on one or more data storage systems of the federated storage environment.

10. The method of claim 9, wherein the logical device identifier is a unique world wide name, the first set of one or more items of data identifying the logical device as a member of the federated storage environment are returned to a client in response to a first non-I/O command issued to the first device over a path to the first device and the logical device identifier is returned to the client in response to a second non-I/O command issued to the first device over a path to the first device.

11. The method of claim 10, wherein the first device has a second identity that is a data storage dependent identity that varies with data storage system upon which storage is provisioned for the first device and wherein the second identity also varies with one or more paths over which the first device is visible.

12. The method of claim 11, wherein, prior to completing said cutover processing for the first device, the first device has said second identity in accordance with the origin data storage system and one or more paths between a host and the origin data storage system over which the first device is visible, and after completing said cutover processing for the first device, the first device has said second identity in accordance with the destination data storage system and one or more paths between a host and the destination data storage system over which the first device is visible.

13. The method of claim 12, wherein the second identity includes a second set of one or more items of information identifying a type of physical data storage system upon which the first device is currently located.

14. The method of claim 13, wherein the second set of one or more items of information are used by said second processing to determine values for said one or more parameters each having a value that varies in accordance with a type of physical data storage system servicing I/O requests, said second set of one or more items being returned to the client in response to sending a third non-I/O command to the first device over a path to the first device.

15. The method of claim 11, wherein at a point during said first processing, the first device is included in the origin data storage system and is visible to a client on a first path between the client and the origin data storage system and a second device is included in the destination data storage system and is visible on a second path between the client and the destination data storage system, wherein the second device is another logical device having said first identity that is said federation level identity of the first device and the second device has a second data storage dependent identity dependent upon a type of physical data storage system of the destination data storage system, and wherein the client identifies the first path and the second path as two different paths to a same device having said first identity that is said federation level identity.

16. The method of claim 1, wherein said detecting and said second processing are performed by the client that sends I/O requests to the first device.

17. The method of claim 16, wherein said client includes a multi-path driver including a federated storage environment module and a plurality of data storage-specific modules, wherein each of said plurality of data storage-specific modules selects values for said one or more parameters for a particular type of physical data storage system.

18. The method of claim 17, wherein said second processing includes said federated storage environment module invoking code of a first of said plurality of data storage-specific modules, said first data storage-specific module being selected based on a type of physical data storage system associated with the destination data storage system.

19. A non-transitory computer readable medium comprising code stored thereon that performs parameter selection, the computer readable medium comprising code that, when executed by a processor, performs a method comprising:
  performing first processing that migrates data of a first device from an origin data storage system to a destination data storage system, said first processing including cutover processing whereby, after said cutover processing is performed, requests to the first device are serviced by the destination data storage system and not said origin data storage system;
  detecting, during said first processing, occurrence of said cutover processing; and
  responsive to detecting the occurrence of said cutover processing, performing second processing to update one or more parameters each having a value that varies in accordance with a type of physical data storage system, wherein prior to said second processing, said one or more parameters have values determined in accordance with a type of physical data storage system associated with the origin data storage system, and wherein after said second processing, said one or more parameters have values determined in accordance with a type of physical data storage system associated with the destination data storage system.

20. A system comprising:
a host;
a federated storage environment including a first data storage system and a second data storage system, wherein the first data storage system is an origin data storage system including a first device and the second data storage system is a destination data storage system with respect to first processing that migrates data of the first device from the origin data storage system to the destination data storage system; and
a host comprising a memory with code stored therein that, when executed by a processor, performs a method comprising:
  detecting, during said first processing, occurrence of cutover processing, wherein said first processing migrates data of the first device from the origin data storage system to the destination data storage system, said first processing including said cutover processing whereby, after said cutover processing is performed, requests to the first device are serviced by the destination data storage system and not said origin data storage system; and
  responsive to detecting the occurrence of said cutover processing, performing second processing to update one or more parameters each having a value that varies in accordance with a type of physical data storage system, wherein prior to said second processing, said one or more parameters have values determined in accordance with a type of physical data storage system associated with the origin data storage system, and wherein after said second processing, said one or more parameters have values determined in accordance with a type of physical data storage system associated with the destination data storage system.

* * * * *